US009263898B1

(12) United States Patent
Ghazarian

(10) Patent No.: US 9,263,898 B1
(45) Date of Patent: Feb. 16, 2016

(54) DUAL BATTERY CHARGER MOBILE COMMUNICATION APPARATUS

(71) Applicant: Ohanes D. Ghazarian, Henderson, NV (US)

(72) Inventor: Ohanes D. Ghazarian, Henderson, NV (US)

(*) Notice: Subject to any disclaimer, the term of this patent is extended or adjusted under 35 U.S.C. 154(b) by 0 days.

(21) Appl. No.: 14/121,079

(22) Filed: Jul. 28, 2014

(51) Int. Cl.
*G08B 1/08* (2006.01)
*H02J 7/00* (2006.01)
*H04W 4/20* (2009.01)
*H04W 4/02* (2009.01)
*G08B 21/18* (2006.01)
*H02J 9/06* (2006.01)

(52) U.S. Cl.
CPC .............. *H02J 7/0021* (2013.01); *G08B 21/182* (2013.01); *H02J 7/007* (2013.01); *H02J 7/0019* (2013.01); *H02J 9/061* (2013.01); *H04W 4/02* (2013.01); *H04W 4/20* (2013.01)

(58) Field of Classification Search
CPC ..... H02J 7/0013; H02J 7/0019; H02J 7/0018; H02J 7/007; H02J 7/0024; H02J 9/061
USPC ........ 340/539.13; 307/66; 320/118, 119, 125, 320/126
See application file for complete search history.

(56) References Cited

U.S. PATENT DOCUMENTS

| | | | | |
|---|---|---|---|---|
| 4,156,171 A * | 5/1979 | Kofink | ............... | 320/123 |
| 5,204,610 A * | 4/1993 | Pierson et al. | ............... | 320/126 |
| 5,311,112 A * | 5/1994 | Creaco et al. | ............... | 320/119 |
| 5,578,875 A * | 11/1996 | Dormer et al. | ............... | 307/66 |
| 5,666,006 A * | 9/1997 | Townsley et al. | ............... | 307/66 |
| 5,684,384 A * | 11/1997 | Barkat et al. | ............... | 307/66 |
| 5,825,100 A * | 10/1998 | Kim | ............... | 307/66 |
| 5,867,007 A * | 2/1999 | Kim | ............... | 320/118 |
| 6,023,147 A * | 2/2000 | Cargin et al. | ............... | 320/114 |
| 6,081,096 A * | 6/2000 | Barkat et al. | ............... | 320/126 |
| 6,184,659 B1 * | 2/2001 | Darmawaskita | ............... | 320/139 |
| 7,642,749 B2 * | 1/2010 | Nishida | ............... | 320/119 |
| 8,643,334 B2 * | 2/2014 | Kuo et al. | ............... | 320/126 |

* cited by examiner

Primary Examiner — John A Tweel, Jr.

(57) ABSTRACT

A positioning locator mobile communication apparatus securely attached to a person or a subject to be monitored, wherein said apparatus utilizes two internal batteries to provide power to the mobile communication device electronic circuitry, and a detachable battery is used to charge the internal batteries. Wherein when the first internal battery is being charged by the detachable battery, the mobile communication device is operative by the second internal battery power. And when the second internal battery is being charged by the detachable battery, the mobile communication device becomes operative by the first internal battery power. The positioning locator mobile communication apparatus may utilize the first internal battery, to provide power to the mobile communication apparatus certain components electronic circuitry, and the apparatus may contain a second rechargeable or non-rechargeable internal battery designed to provide power to the mobile communication apparatus at least one other electronic circuitry.

14 Claims, 18 Drawing Sheets

DUAL BATTERY CHARGER MOBILE COMMUNICATION APPARATUS

This application benefits provisional application No. 61/958,944 filed on Aug. 9, 2013

BACKGROUND OF THE INVENTION

There are many battery charging methods used in to-days portable or user carry on electronic communication devices. Such one commonly known system found in mobile phones or note book PC, note pads, tracking apparatuses or other portable electronic devices, wherein the mobile communication device contains an internal battery and when the battery goes low the user plug's the communication device to an A/C outlet or car cigarette lighter plug to charge the battery or operate the device. Unfortunately this method is not practical in use primarily when the mobile communication device battery goes low and the user has no access to an A/C outlet neither to a car cigarette lighter adaptor to charge the battery, in such conditions the mobile communication device becomes useless.

And even if such mobile communication devices were use in applications wherein the communication device required to be securely attached to a person such as an offender, in this case when the communication device battery goes low the offender will be stranded at least for 3 hours to an A/C outlet or to a vehicle cigarette lighter adapter to charge the mobile communication device battery, and if happens to be the offender is located in an area where there is no A/C outlet or car cigarette lighter adaptor to charge the tracking device battery, the offender's mobile communication device becomes un operative and the offender falsely will be in a violation condition.

Recently there have been new improved methods used to overcome this problem, such that when a mobile communication device internal battery goes low, the user can plug an external battery to operate and charge the mobile communication internal battery, the external battery during charging the internal battery additionally have to provide power to the wireless communication electronic circuitry, thus putting the external battery under hi current discharge condition, by supplying power to charge the internal battery and simultaneously supplying power to the communication device electronic circuitry, specifically when the mobile communication initiates an outgoing call wherein hi current is consumed from the battery, as common knowledge this higher current discharge condition will shorten the battery cell life. In addition such teaching use cannot provide secure mobile communication device operation all the time, such that if the mobile communication device internal battery becomes exhausted and does not hold charge, then the mobile communication device becomes un-operative and useless wherein when the external battery is disconnected for the purpose of charging.

One such teaching is found in prior at U.S. Pat. No. 7,804,412 to Derrick, wherein teaches use of a tracking communication device securely attached to the user, wherein the internal battery is within the housing, and a detachable battery re-movably secured to the housing, which provides power to the tracking device and simultaneously charges a single internal battery upon being secured to the tamper resistant housing, whereas the internal battery is adapted to provide power to the tracking device only when the detachable battery is disconnected or depleted.

Contrary to the present invention wherein the communication apparatus contains two internal batteries, and the external detachable battery is used for the purpose of to charge only the $1^{st}$ and $2^{nd}$ internal batteries. The present invention detachable battery does not provide power to the tracking device electronic circuitry as illustrated in U.S. Pat. No. 7,804,412 to Derrick which indeed it does. And the present invention battery condition detection circuitry is configured to control power switching circuitry to provide power from the communication apparatus $1^{st}$ and $2^{nd}$ internal battery one at a time to the communication apparatus electronic circuitry.

Therefore it is the primary objective of the present invention mobile communication apparatus, designed to utilizes two internal batteries to provide power to the mobile communication device electronic circuitry, and uses a detachable battery or other attachable wireless power source to charge the internal batteries. Wherein when the detachable battery is charging the first internal battery, the detachable battery does not supply power to the communication apparatus electronic circuitry, contrary to the prior art teaching found in U.S. Pat. No. 7,804,412 to Derrick the detachable battery does. Thus the present invention detachable battery is discharging at lower current rate compared to the prior art teaching detachable battery, while the present invention mobile communication device second internal battery providing power to the apparatus electronic circuitry. And when the second internal battery is been charged by the detachable battery, the mobile communication device first internal battery is providing power to the apparatus electronic circuitry, there for the present invention teaching prolongs the detachable battery cell life.

And it is another objective of the present invention wherein when the first internal battery or the second internal battery becomes exhausted and does not hold battery charge. The present invention mobile communication apparatus will alert the user the presence of example; a defective first battery condition, while the mobile communication device is operative with the secondary internal battery power, thus giving ample time for the user to replace the internal defective battery, which provides definite improvement in the art since the prior art teaching does not teach the use of a secondary internal battery, to be used as a secondary power source when the first internal battery becomes exhausted.

And it is another objective of the present invention to have 3 level low battery detection and charging circuitry, which upon $1^{st}$ level low battery detection, using a detachable battery power it automatically charges the mobile communication apparatus first internal battery while the apparatus is powered by the secondary internal battery, and the detachable battery automatically charges the internal secondary battery while the apparatus is powered by the first internal battery. And the present invention apparatus is configured to generate alert signal(s) to the user upon detection of $2^{nd}$ level low battery condition, for the user to attach or insert a detachable battery, or use an external wireless power source to charge the low internal battery. And the present invention mobile communication apparatus is configured to broadcast a signal to a monitoring station when $3^{rd}$ level low battery condition is detected, such that apparatus internal battery condition is nearing to become exhausted. In addition the present invention mobile communication apparatus may generate alerting signal to the user when the detachable battery or external wireless power source becomes low or disconnected.

It is another objective of the present invention utilizes a user carry on mobile communication apparatus securely attached to a person to be monitored, which comprises; a housing containing at least two internal batteries, each one of the batteries used one at a time to provide power to the apparatus electronic circuitry, and a detachable battery attached or inserted into the housing. Wherein the detachable battery is used to charge the either internal low battery, when it is attached or inserted to the apparatus housing. The present invention apparatus contains a processor having a first, second and third level low internal battery detection circuitry, and a detachable low battery detection circuitry, a battery charging circuitry, a battery switching circuitry, the processor is configured to switch the power switching circuitry to supply power from example: the second internal battery to the apparatus electronic circuitry, while charging the first battery using power supply from the detachable battery, and a low battery detection signaling device used to produce distinctive alert signals to the user to insert the detachable battery to charge at least one of the internal low battery.

It is another objective of the present invention utilizes a mobile communication apparatus having an electronic circuitry powered by the first internal battery, and when the first internal battery condition becomes low to a first level, the processor detects the low battery condition and the processor accordingly adapts the detachable battery to charge the first internal battery, and the processor battery switching circuitry adapts the second internal battery to provide power to the mobile communication apparatus electronic circuitry.

And wherein the second internal battery condition becomes low to a first level, the processor detects the low battery condition and the processor accordingly adapts the detachable battery to automatically charge the second internal battery, and the processor battery switching circuitry adapts the first internal battery to provide power to the mobile communication apparatus electronic circuitry.

It is another objective of the present invention wherein the mobile communication apparatus electronic circuitry is powered by the first internal battery, and when the first internal battery becomes low to a second level, the processor detects the second level low battery condition and the processor initiates the signaling device to produce an alert signal to notify the user to attach or insert a charged up detachable battery to charge the internal first battery.

And wherein when the second internal battery becomes low to a second level, the processor detects the second level low battery condition and the processor initiates the signaling device to produce an alert signal to notify the user to attach or insert a charged up detachable battery to charge the second internal battery.

And further objective of the present invention to utilize a mobile communication apparatus having a processor in conjunction with a signaling device, which is configured to initiate an alert signal to notify the user that the apparatus detachable battery has reached a predetermined low power level, for the user to remove the detachable battery and charge the detachable battery with an external battery charger. The processor alerting circuitry may initiate alert signal for the user to re-attach or insert the charged detachable battery to the housing. If the user fail to attach a charged up detachable battery wherein $3^{rd}$ level low internal battery condition is detected, the mobile communication apparatus broadcasts a warning signal to a monitoring station indicating at least one or both internal batteries reached a third low level battery condition.

And another objective of the present invention wherein it utilizes a positioning locator mobile communication apparatus, which is securely attached to an person to be monitored, utilizes a detachable battery to charge the positioning locator mobile communication device first internal battery, and the first internal battery is configures to provide power to the mobile communication apparatus certain components electronic circuitry, and the apparatus may contain a second non rechargeable or chargeable internal battery designed to provide power to the mobile communication apparatus at least one other electronic circuitry.

And another objective of the present invention wherein it utilizes a positioning locator mobile communication apparatus, which is securely attached to an person to be monitored, utilizes a detachable battery to charge the positioning locator mobile communication device first internal battery at a duty cycle, and the first internal battery is configures to provide power at a duty cycle to the mobile communication apparatus certain components electronic circuitry, and the apparatus may contain a second non rechargeable battery to provide power to the mobile communication apparatus at least one other electronic circuitry. There after the use of small amount of duty cycle charge and discharge teaching of present invention is used to prolong the internal battery charging cycle.

And another objective of the present invention wherein it utilizes a positioning locator mobile communication apparatus, which is securely attached to an person to be monitored, utilizes a detachable battery to charge the positioning locator mobile communication device first internal battery at a duty cycle, and the first internal battery is configures to provide power at a duty cycle to the mobile communication apparatus certain components electronic circuitry, and the apparatus may contain a second rechargeable battery which is charged by the detachable battery at different duty cycle timing then the first battery, and provide power at least to the apparatus one other electronic circuitry, at a different prolonged duty cycle timing then compare to the mobile communication apparatus first internal battery power providing duty cycle.

It is further objective of the present invention to utilize a detachable battery used to charge dual internal batteries, which is designed to be used in applications wherein mobile communication apparatus operation is required all the time without having any battery power supply interruption, such as mobile phones, mobile PC, note pads will be useful at all time for emergency calls, receipt or transmit emergency data information, GPS data logging/tracking applications, and specifically the art becomes useful in tracking offenders, providing the offender the comfort to charge the securely attached tracking devices in any location with prolong battery life usage.

And further objective of the present invention is to provide an apparatus containing a positioning locator such as a GPS receiver, or cellular, or RF radio transceiver used to coordinate the apparatus location, and it utilizes the cellular, satellite or radio frequency communication module to communicate with a monitoring station, and the apparatus may have a tamper detection housing attached to a person or an object, with a removal or tamper detection circuitry, or a tamper detection strap may be used to attached the apparatus to a person or an object, to securely locate individuals or objects under surveillance. The present invention teaching provides the user the ability to charge the mobile communication apparatus internal batteries at remote locations, and provides a first or second internal battery to supply power to the mobile communication apparatus electronic circuitry, when the first or second internal battery is in charge mode, or when the first or second internal battery becomes exhausted and not hold charge.

SUMMARY OF THE INVENTION

A positioning locator mobile communication apparatus securely attached to a person to be monitored, wherein the apparatus utilizes two internal batteries to provide power to the mobile communication device electronic circuitry, and a detachable battery is used to charge the internal batteries.

Wherein when the first internal battery is being charged by the detachable battery, the mobile communication device is operative by the second internal battery power. And when the second internal battery is been charged by the detachable battery, the mobile communication device becomes operative by the first internal battery power.

The positioning locator mobile communication apparatus may utilize the first internal battery, to provide power to the mobile communication apparatus certain components electronic circuitry, and the apparatus may contain a second non rechargeable internal battery designed to provide power to the mobile communication apparatus at least one other electronic circuitry.

DETAILED DESCRIPTION OF THE INVENTION

Figure 6:
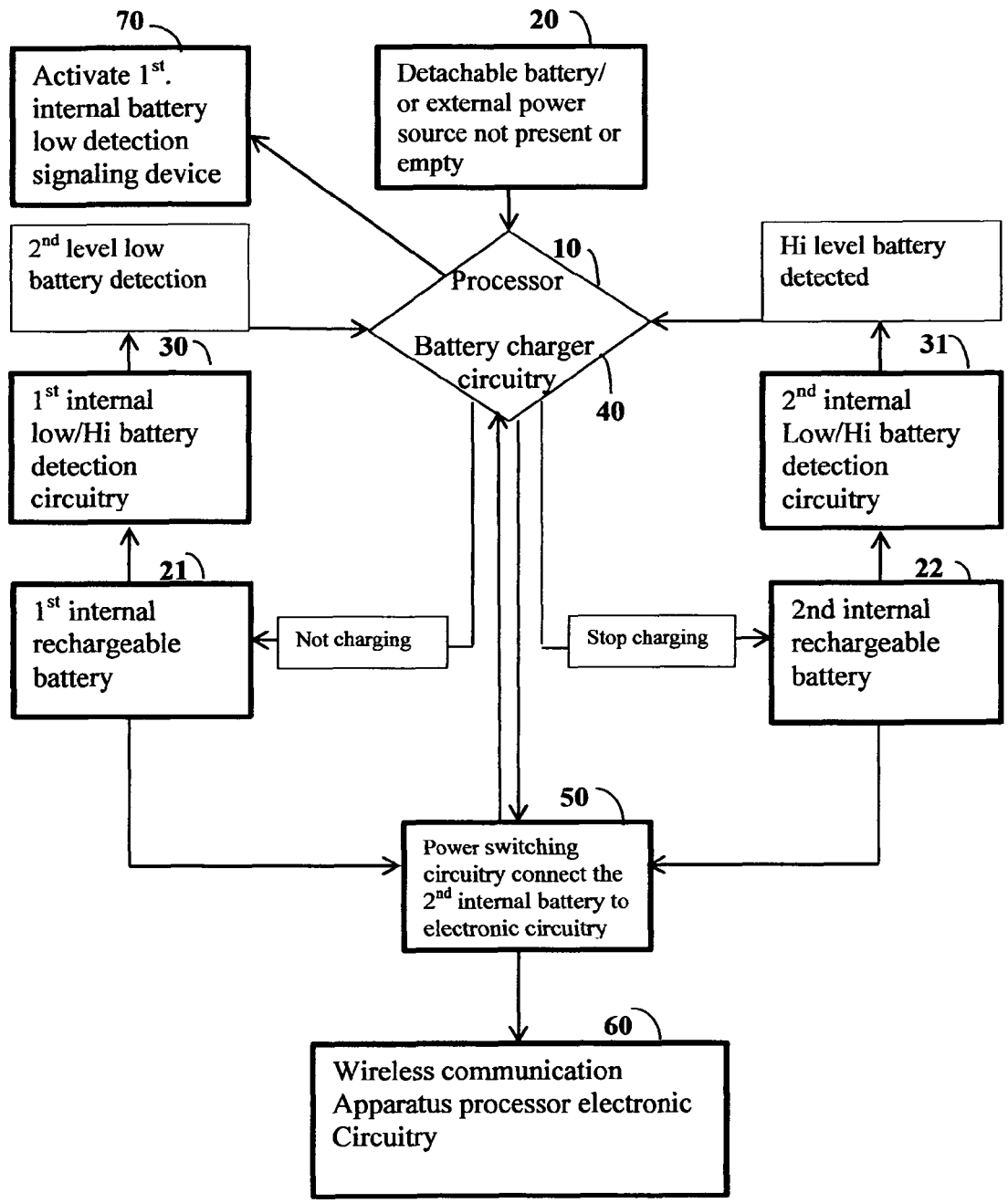
FIG. 6 Is a block diagram flow chart wherein the detachable battery is not present or empty, the battery charging circuitry is not able to charge the first battery, and the processor is activating low internal $1^{st}$ battery detection signaling device, while power switching circuitry is providing power from the $2^{nd}$ internal battery to the apparatus electronic circuitry.
Figure 17:
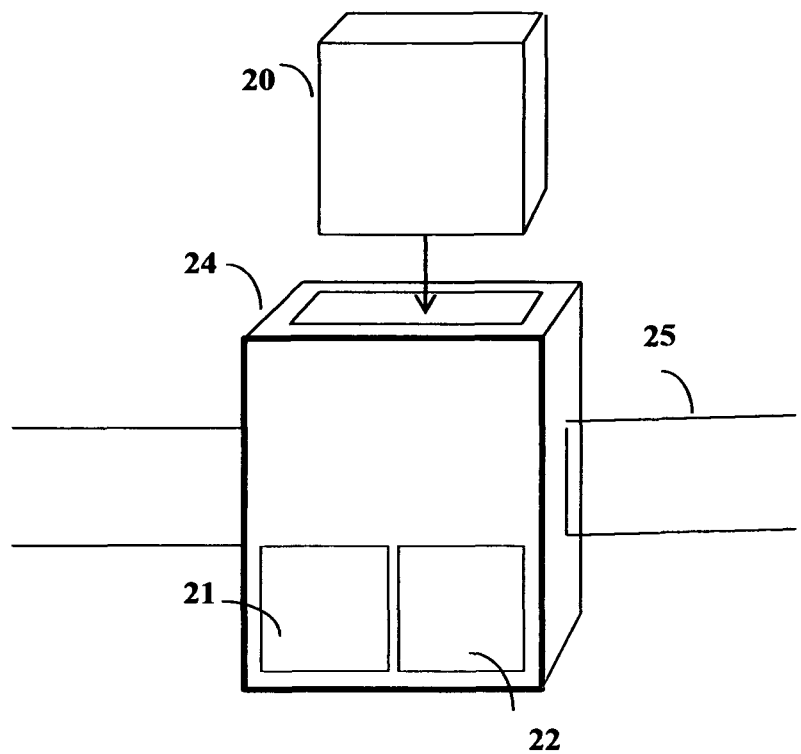
FIG. 17 Illustrates a mobile communication apparatus containing two internal batteries, and one detachable battery used to charge the first and second internal battery, or the first internal battery only, it is securely attached by a strap to a person or subject to be monitored having a tamper detection housing and a removal tamper detection strap.

The present invention carry on mobile communication apparatus, FIG. 17, 18, 19 securely attached to a person or subject 28 to be monitored, comprises; a housing 24 containing at least two internal batteries 21, 22 each providing power one at a time FIG. 6 to the wireless communication apparatus processor electronic circuitry 60, wherein the internal batteries are within the apparatus housing 24; and a detachable battery 20 attached or inserted into the housing 24, wherein the detachable battery 20 used to charge the internal batteries 21, 22 one at a time, upon being attached or inserted to the apparatus housing 24; In addition each internal battery 21, 22 one at a time provide power through a power switching circuitry 50 to the apparatus processor electronic circuitry 60, wherein when the detachable battery 20 is attached, disconnected or depleted. The present invention apparatus 24 contains a battery charging processor 10 having a low battery detection circuitry 30, 31 capable of detecting $1^{st}$, $2^{nd}$ and $3^{rd}$ level first and second internal low battery detection, and utilizes FIG. 11 a detachable low battery detection circuitry 90, a battery charging circuitry 40, a battery power switching circuitry 50, and a low battery detection signaling device 70, which is designed to produce distinctive alert signal(s) for the user to attach a detachable battery 20, to charge the first or second internal batteries 21,22. Also the first and second battery condition detection circuitry 30, 31 is configured to detect Hi internal battery 21, 22, condition, and accordingly activate the signaling device 70 for the user to operate the apparatus.

Figure 4:
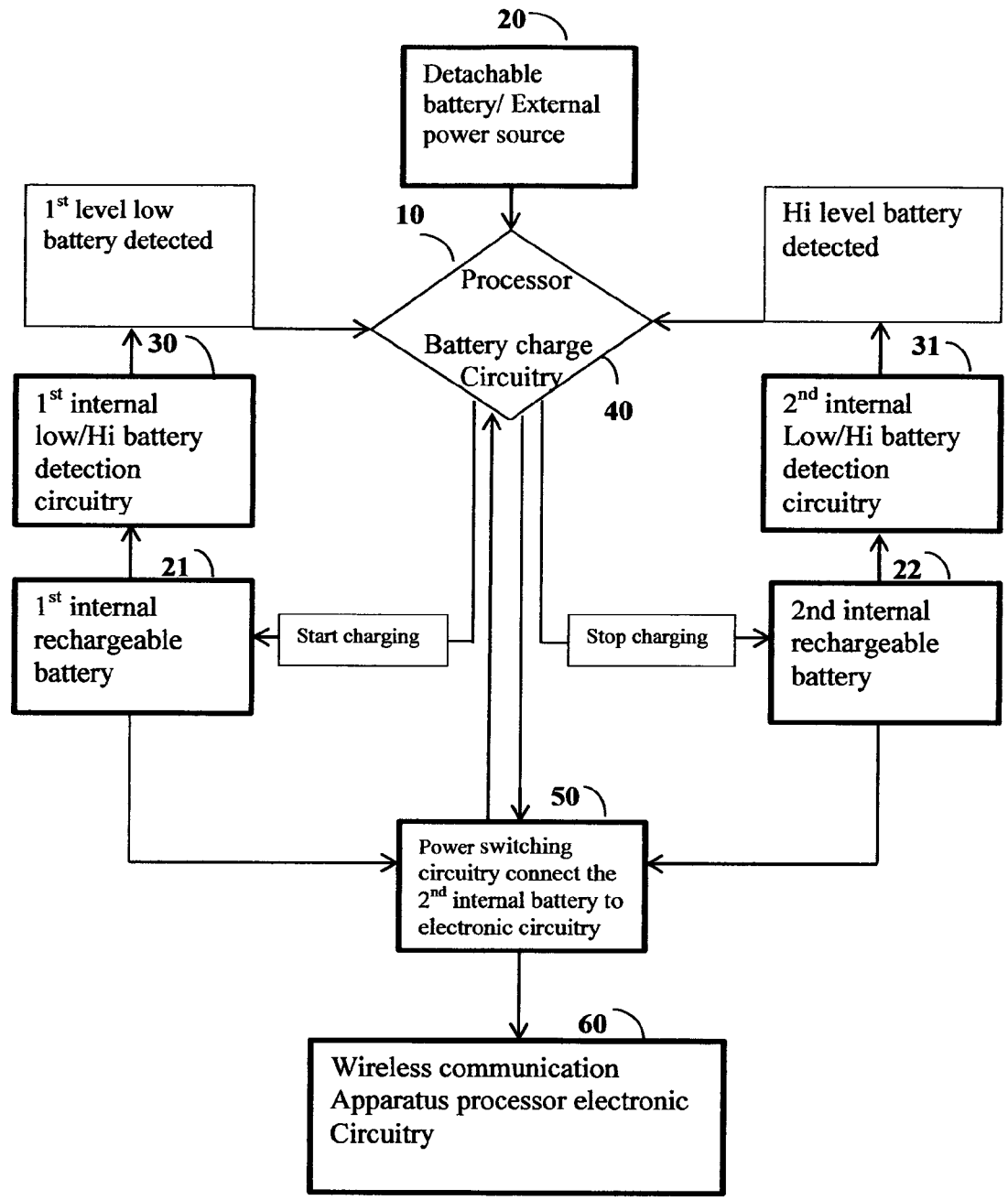
FIG. 4 Is a block diagram flow chart wherein the low battery detection circuitry detecting $1^{st}$ internal battery $1^{st}$ level low battery condition, and the processor battery charging circuitry is charging circuitry using the detachable battery power to start charging the first internal battery, while the power switching circuitry is providing power from the $2^{nd}$ internal battery to the apparatus electronic circuitry.
Figure 5:
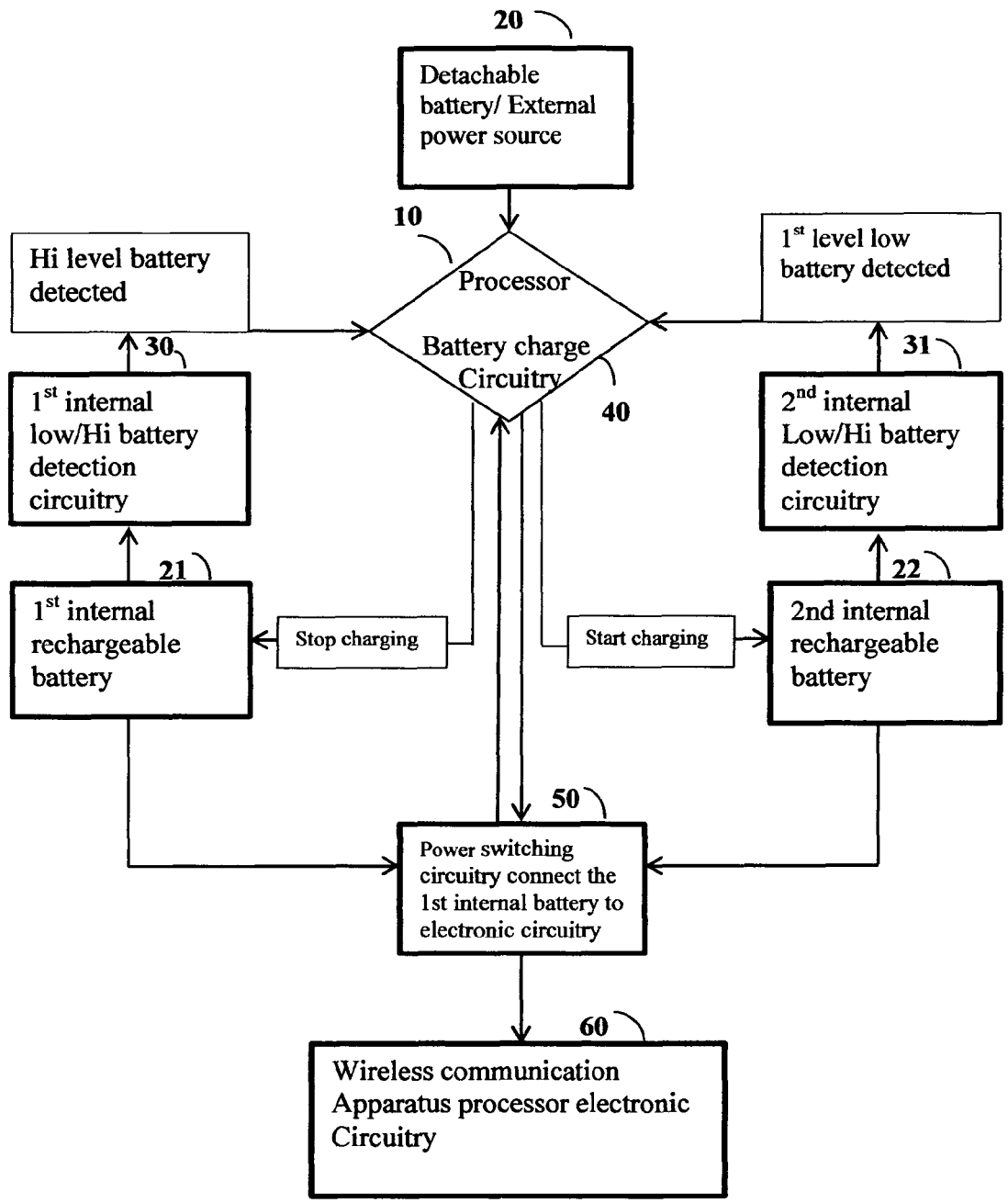
FIG. 5 Is a block diagram flow chart wherein the low battery detection circuitry detecting $2^{nd}$ internal battery $1^{st}$ level low battery condition, the power switching circuitry is connecting the battery charging circuitry to the detachable battery to start charging the $2^{nd}$ internal battery, while the power switching circuitry is providing power from the 1st internal battery to the apparatus electronic circuitry.

The present invention apparatus, FIG. 4, the processor 10, $1^{st}$ internal battery 21 condition detection circuitry 30 detects $1^{st}$ level low battery condition, and $2^{nd}$ internal battery 22 battery condition detection circuitry 31, detects Hi level battery condition. The processor 10 upon detection of $1^{st}$ internal battery 21, at $1^{st}$ level low battery condition example; 400 ma remaining capacity, the battery charging circuitry 40 processor 10 automatically start charging the $1^{st}$ internal battery. FIG. 5, and the $2^{nd}$ low battery detection circuitry 31 upon detecting $2^{nd}$ internal battery at $1^{st}$ level low battery condition, example at 400 ma remaining capacity, the battery charging circuitry automatically start charging the $2^{nd}$ internal battery 22.

FIG. 6, wherein the $1^{st}$ internal battery 21 condition detection circuitry 30 detects $2^{nd}$ low level battery condition example at 375 ma remaining capacity, the battery charging circuitry 40 processor 10 automatically activates the wireless communication apparatus signaling device 70 for the user to attach a fully charged up detachable battery 20, to charge the internal battery.

Figure 7:
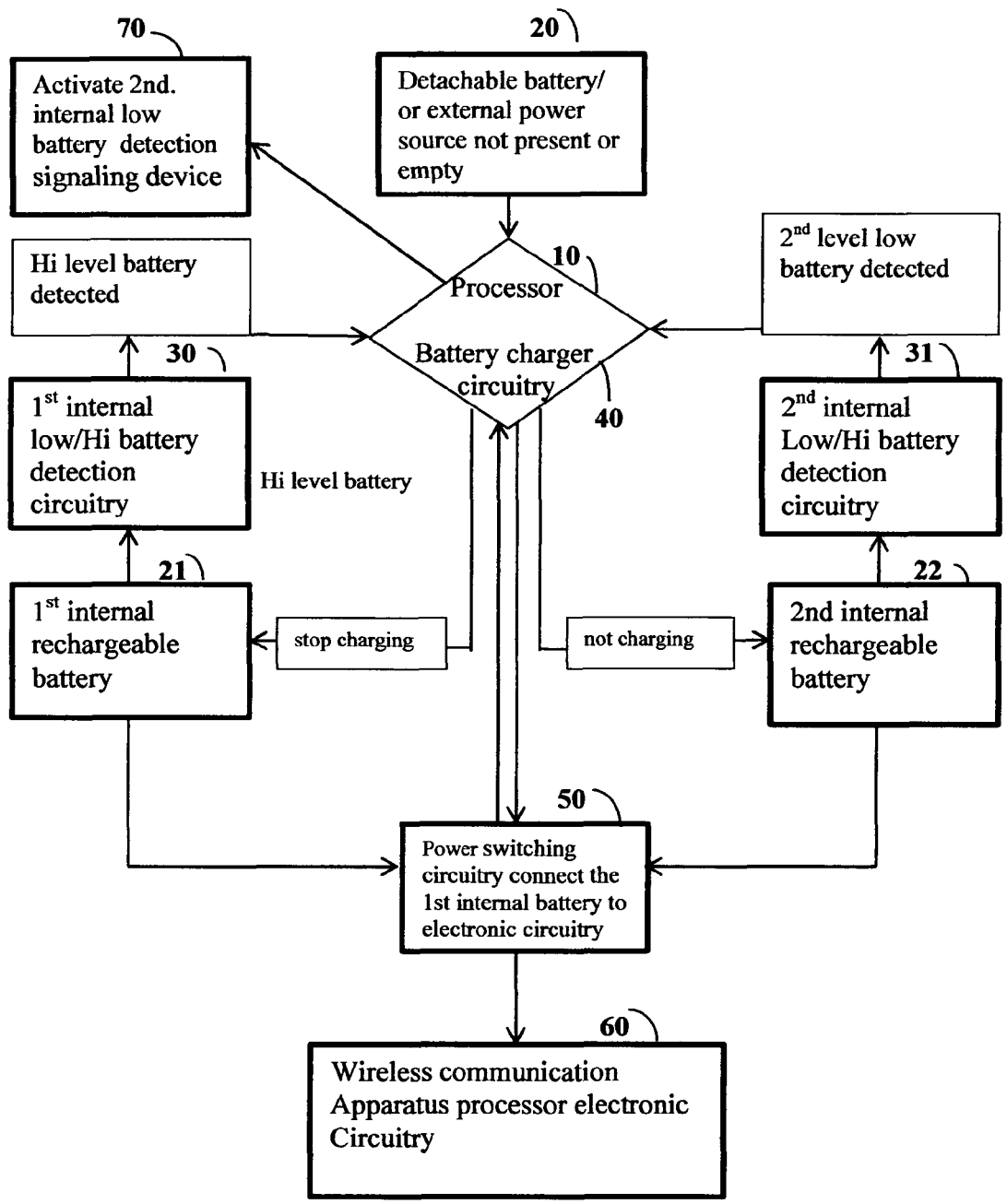
FIG. 7 Is a block diagram flow chart wherein the detachable battery is not present or empty, the low battery detection circuitry detecting $2^{nd}$ internal battery at $2^{nd}$ level low battery condition, and the power switching circuitry is connected to $1^{st}$ internal battery to provide power to the electronic circuitry. And the battery charging circuitry is not charging the $2^{nd}$ internal battery, the processor activating the $2^{nd}$ internal low battery detection condition signaling device circuitry.

FIG. 7 the $2^{nd}$ low battery detection circuitry 31 upon detecting $2^{nd}$ internal battery 22, $2^{nd}$ level low battery detection, example at 373 ma remaining capacity, the battery charging circuitry 40 processor 10 automatically activates the wireless communication apparatus signaling device 70 for the user to attach a fully charged up detachable battery 20 to charge the $2^{nd}$ internal battery 22.

Figure 10:
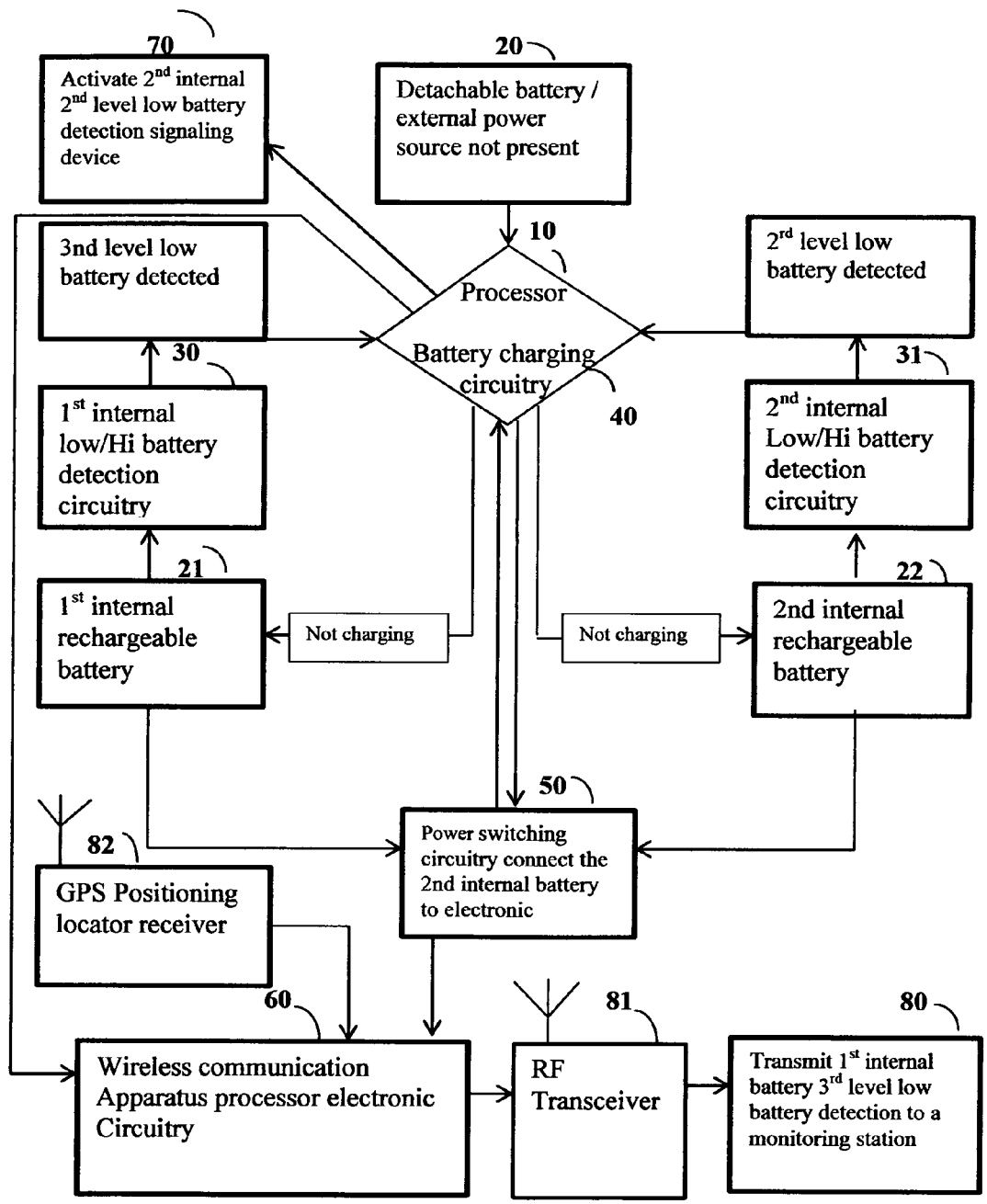
FIG. 10 Is a block diagram flow wherein the detachable battery is not attached, the first internal battery condition detection circuitry detecting $3^{rd}$ level low battery condition, and the $2^{nd}$ internal battery is providing power to the communication apparatus electronic circuitry and to the battery charging processor to activate $2^{nd}$ internal battery $3^{rd}$ level-le low battery detection signaling circuitry. The power switching circuitry is connected to the $2^{nd}$ internal battery to supply power to the communication apparatus electronic circuitry, and the communication electronic circuitry processor transmitting $1^{st}$ internal battery $3^{rd}$ level low battery detection condition information to a monitoring station.

FIG. 10 wherein the $2^{nd}$ internal battery 22 condition detection circuitry 31 detects the $2^{nd}$ internal battery at $2^{nd}$ level low battery condition, example at 375 ma capacity remaining, and $1^{st}$ internal battery 21 condition detection circuitry 30 detects $1^{st}$ internal battery at $3^{rd}$ level low battery condition, example at 150 ma remaining capacity, the battery charging circuitry 40 processor 10 automatically activates the $2^{nd}$ internal low battery detection signaling circuitry 70, and transmits a signal through the wireless communication electronic circuitry 60 to a monitoring station 80 containing information of the apparatus $3^{rd}$ level low battery detection condition.

Figure 1:
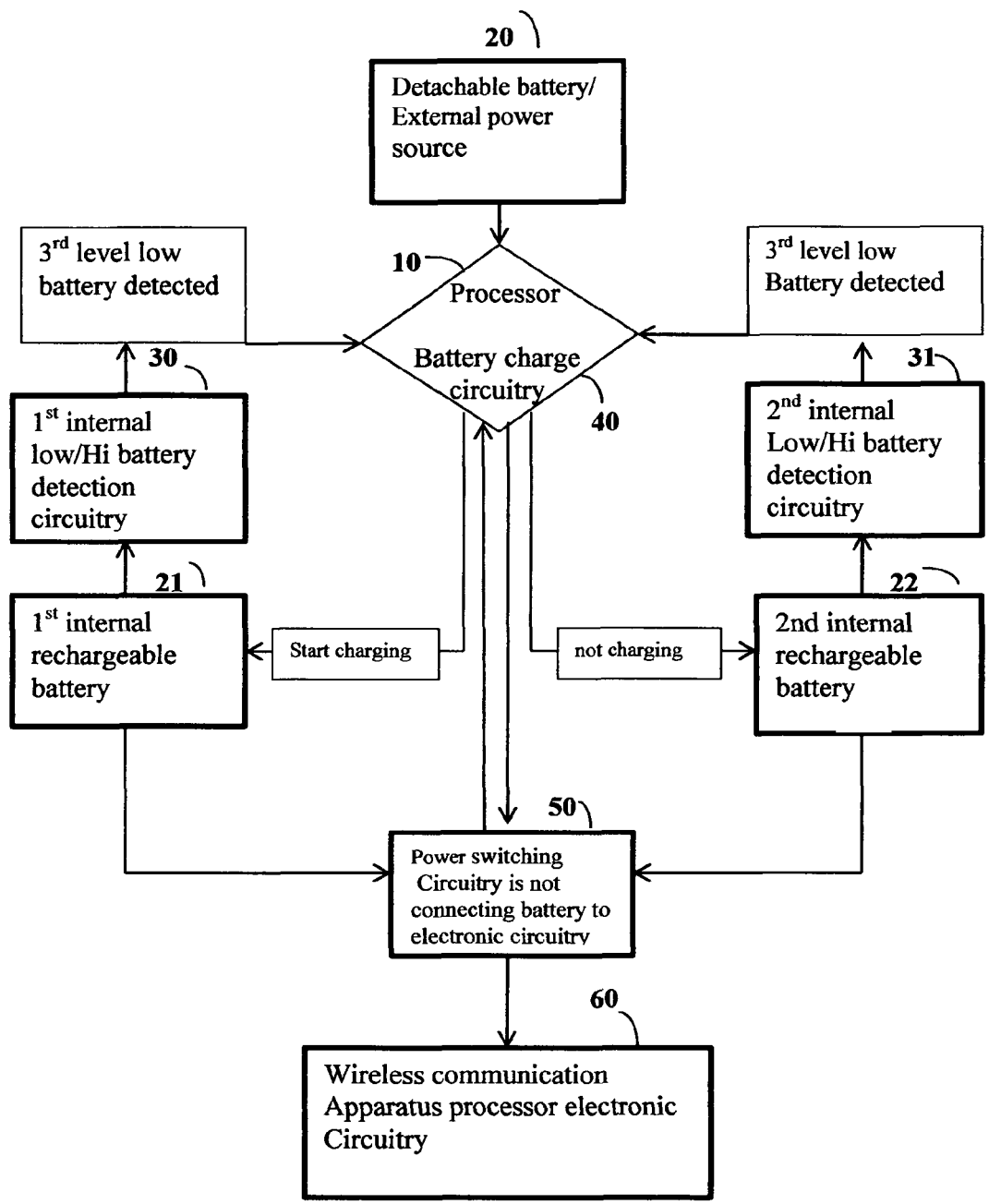
FIG. 1. Is a block diagram flow chart wherein the 1st internal battery is $3^{rd}$ level low condition or below, and the second internal battery is $3^{rd}$ level low condition or below, the battery charging circuitry is charging the first internal battery as the detachable battery is attached. Whereas the battery charging circuitry is not charging the $2^{nd}$ internal battery. And the power switching circuitry is not supplying power to the apparatus electronic circuitry.

The present invention mobile communication apparatus FIGS. 17, 18, and 19 having a housing 24 contains FIG. 1 a first internal battery 21, and a second internal battery 22, both batteries are below $3^{rd}$ level low battery condition, and the power switching circuitry 50 is not connecting $1^{st}$ or $2^{nd}$ internal battery 21, 22 to the apparatus processor electronic circuitry 60, there for both internal batteries 21, 22 are not supplying power to the communication apparatus electronic circuitry 60. The battery charging 40 processor 10 is charging the $1^{st}$ internal battery 21 using the detachable battery 20 as a power source, and the battery charging circuitry 40 processor 10 is not charging the apparatus $2^{nd}$ internal battery 22.

Wherein the battery charging circuitry 40 is configured to obtain power from the detachable battery 20, to charge the first internal battery 21, without supplying power to the wireless communication apparatus electronic circuitry, 60 and the battery charging circuitry is not charging the second internal battery, 22.

Figure 2:
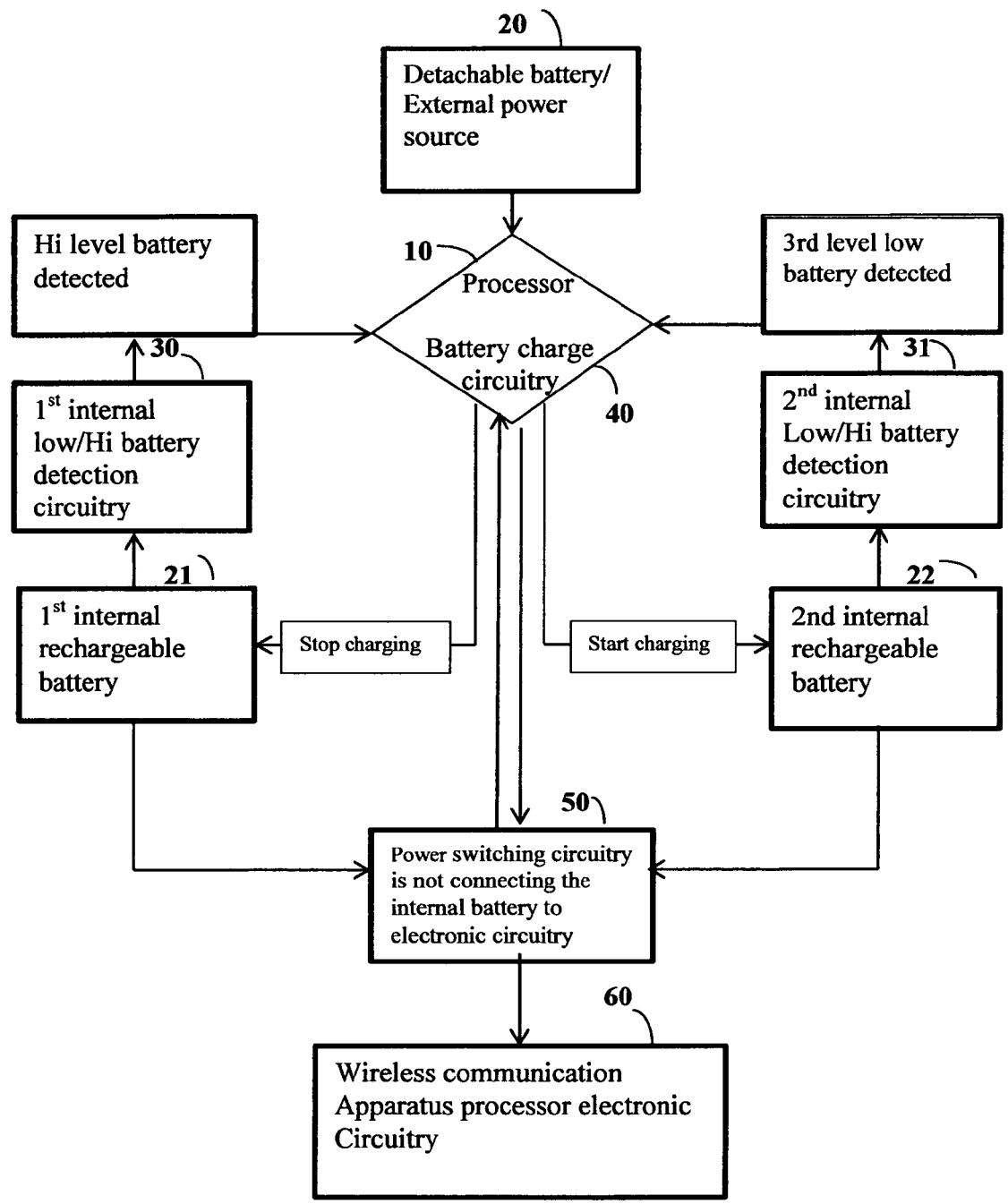
FIG. 2 Is a block diagram flow chart wherein the $1^{st}$ internal battery is fully charged, and the 2nd battery is $3^{rd}$ level low condition or below. The battery charging circuitry start charging the second battery, and stop charging $1^{st}$ internal battery, and the power switching circuitry is not supplying power to the apparatus electronic circuitry.
Figure 3:
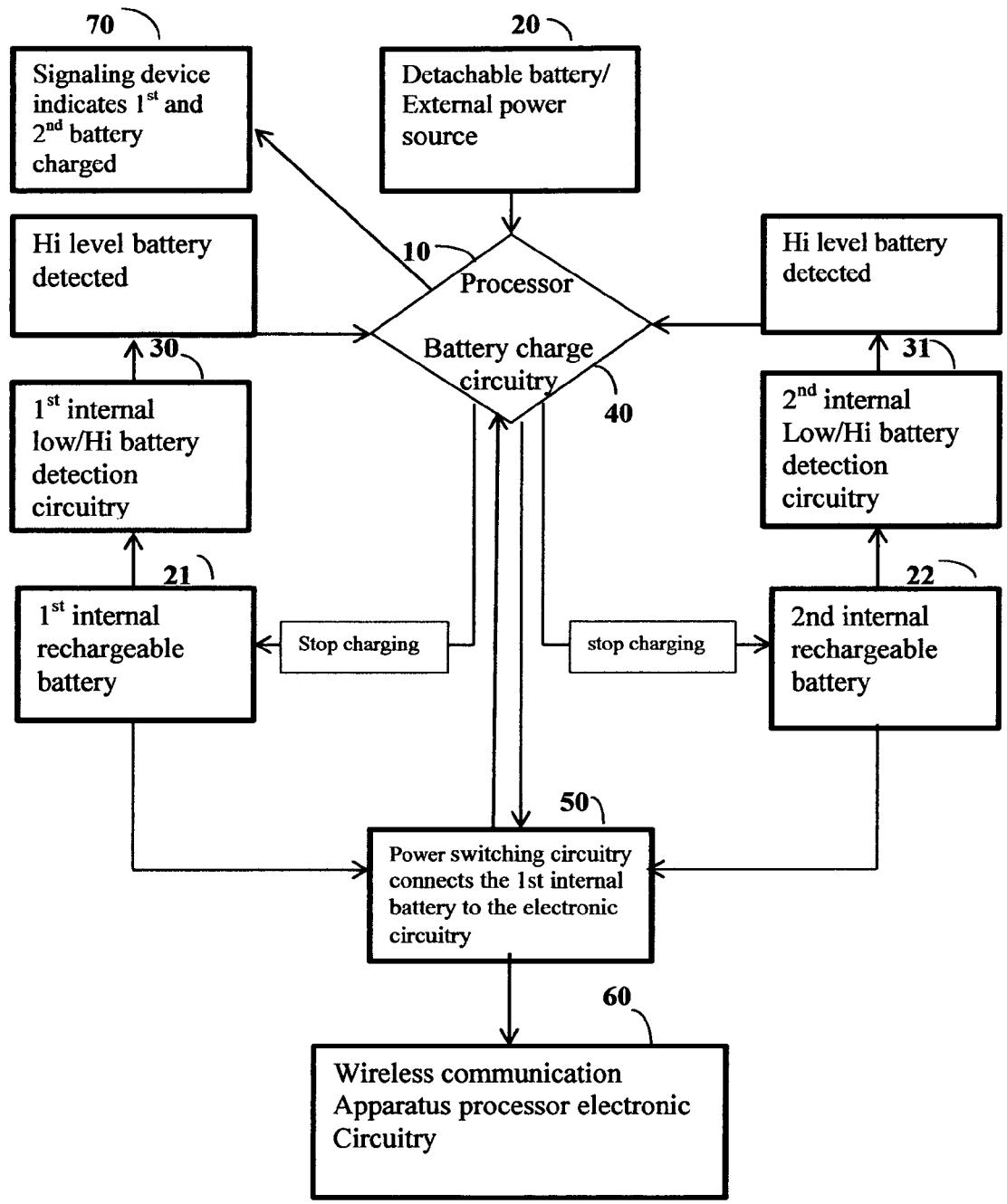
FIG. 3 Is a block diagram flow chart wherein the $1^{st}$ and $2^{nd}$ internal batteries are fully charged, and the power switching circuitry supplying power from the $1^{st}$ internal battery, to the apparatus processor electronic circuitry.

FIG. 2, Wherein when the first battery 21 becomes fully charged the processor 10, $1^{st}$ battery condition detection circuitry 30 detects $1^{st}$ internal battery 21 at Hi level charged condition, the processor 10 sends a signal to the battery charging circuitry 40 to stop charging the $1^{st}$ internal battery 21, and start charging the $2^{nd}$ internal battery 22. Thus the detachable battery 20 charging one battery at a time without supplying power to the wireless communication processor electronic circuitry 60, there for it is discharging at lower current rate, thus prolonging the detachable battery 20 cell life. As seen in the FIG. 2 the power switching circuitry is not providing power from the $1^{st}$ and $2^{nd}$ internal batteries 21, 22 to the communication apparatus electronic circuitry.

Wherein when the $1^{st}$ and $2^{nd}$ internal battery FIG. 3, condition detection circuitry 30, 31 detects high $1^{st}$ and $2^{nd}$ internal battery 21, 22 condition, the processor 10 sends a signal to the power switching circuitry 50, to provide power from the $1^{st}$ internal battery 21 to the apparatus processor electronic circuitry 60, and supplies power to the battery charging processor circuitry. When the user removes the detachable battery for charging, the $1^{st}$ internal battery 21 will provide power to the battery charging processor 10 circuitry.

Wherein when the 1st internal battery 21, condition becomes at $1^{st}$ level low example; 400 ma capacity, FIG. 4 the mobile communication apparatus battery charging processor circuitry 40 activates the power switching circuitry 50 to provide power from the second internal battery 22 to the apparatus electronic circuitry 60. And stop charging the $2^{nd}$ internal battery.

FIG. 5 wherein when the $2^{nd}$ internal battery condition detection circuitry 31 detects $2^{nd}$ internal battery at $1^{st}$ low battery level condition example at 400 ma capacity remaining, the processor 10, start automatically charging the $2^{nd}$ internal battery 22, and the processor connects the power switching circuitry 50 to the $1^{st}$ internal battery 21 to provide power to the wireless communication apparatus processor electronic circuitry 60.

The apparatus alerting circuitry FIG. 6, wherein the apparatus processor $1^{st}$ internal battery condition detection circuitry 30 detects first internal battery 21, at $2^{nd}$ level low battery condition example; at 375 ma capacity remaining, the processor 10 activates the alerting circuitry 70, and generates alert signal for the user to insert a charged up detachable battery 20, or use an wireless external power source to charge the low internal $1^{st}$ battery 21, and the power switching circuitry 50 connects the second internal battery 22 to provide power to the wireless communication processor electronic circuitry 60, and provides power to the battery charger 40 processor circuitry 10, and stop charging the internal $2^{nd}$ battery 22.

Figure 8:
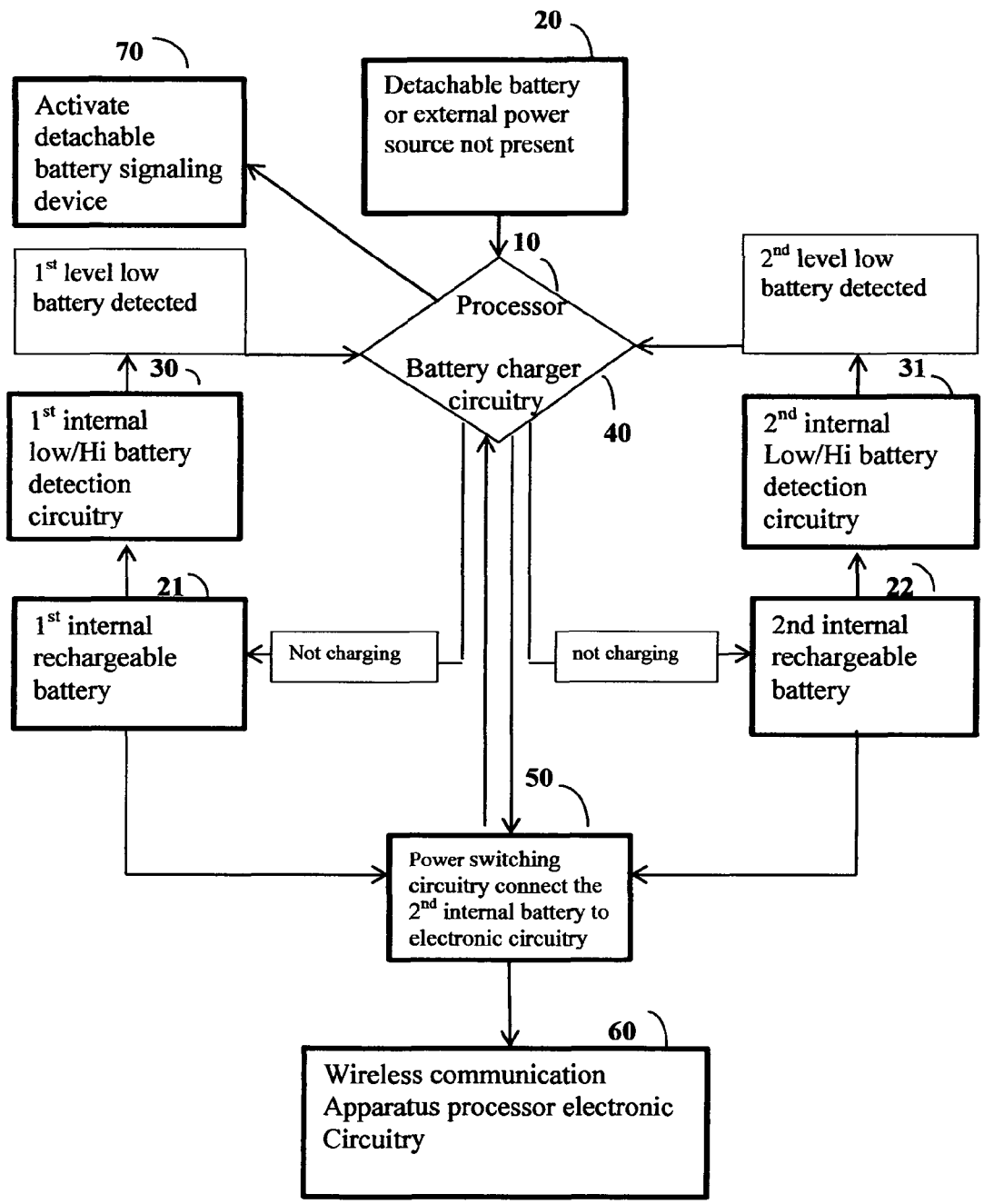
FIG. 8, Is a block diagram flow wherein the detachable battery is not attached to the apparatus or empty, and the battery charging circuitry is not able to charge the $1^{st}$ internal battery, and the power switching circuitry is providing power to the apparatus electronic circuitry from the $2^{nd}$ internal battery, and the processor activating signaling device circuitry indicative of $2^{nd}$ internal battery is low and the detachable battery is exhausted or not attached to the apparatus.
Figure 9:
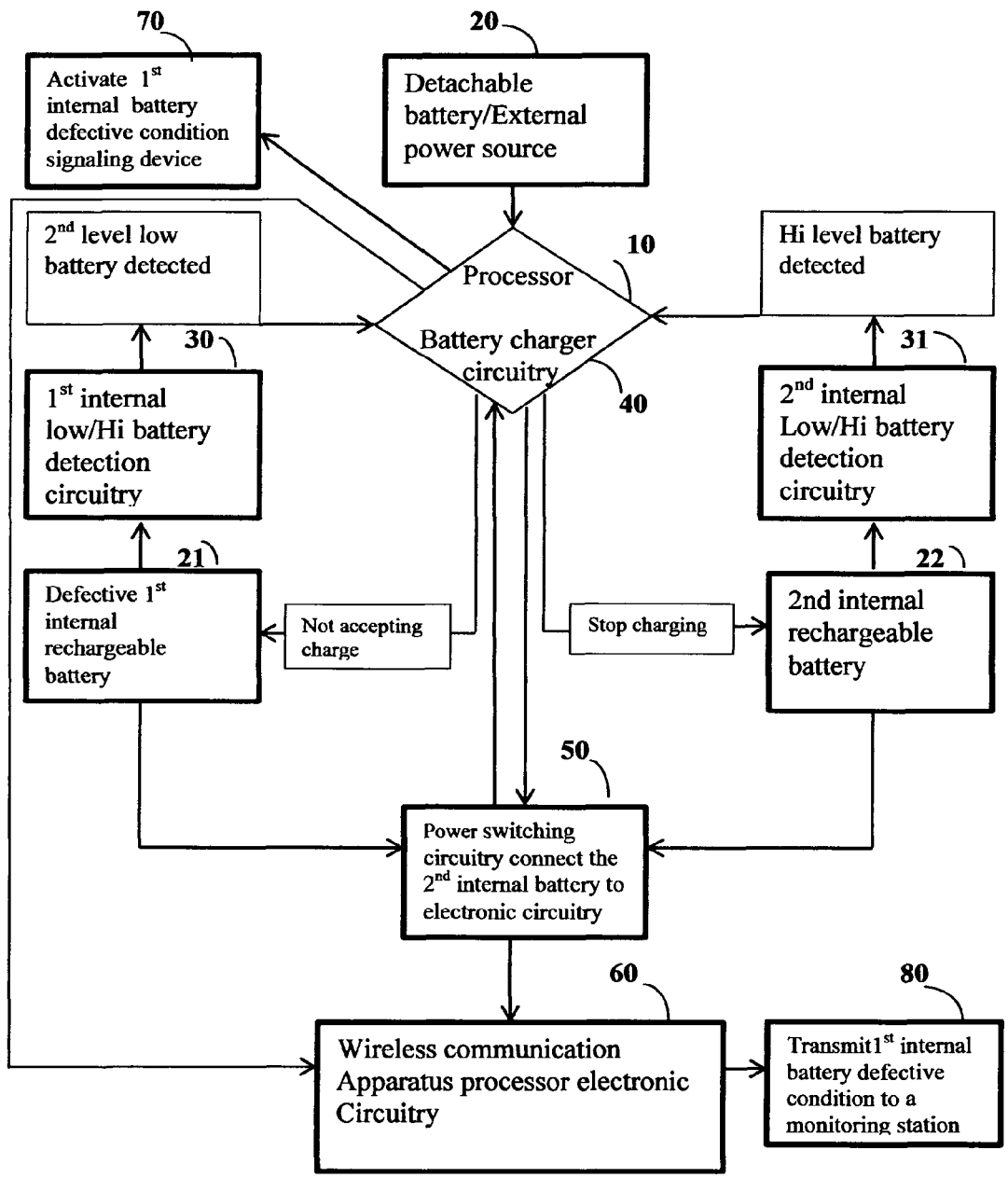
FIG. 9 Is a block diagram flow wherein the detachable battery is attached to the apparatus, and the battery charging circuitry is not able to charge the 1st internal battery, and the power switching circuitry is providing power to the apparatus electronic circuitry from the 2nd internal battery, and the processor activating signaling device circuitry indicative of $1^{st}$ internal battery is not holding charge, and transmitting a signal to the monitoring station indicative first internal battery being defective.

FIG. 7 Wherein the detachable battery 20 source is not attached or empty, the $2^{nd}$ internal low battery detection circuitry 31 detects the $2^{nd}$ level low internal battery detection example at 375 ma capacity remaining, the battery charging circuitry 40 processor 10 powered by the $1^{st}$ internal battery 21, is not charging the second internal battery 22, as a detachable battery 20 is required to be attached to the apparatus to charge the $2^{nd}$ internal battery 22, and the processor 10 activating the $2^{nd}$ internal low battery detection signaling circuitry 70 for the user to attach a charged up detachable battery 20 to charge the internal $2^{nd}$ battery 22, and the processor adapts the power switching circuitry 50 for the first internal battery 21 to provide power to the mobile communication apparatus electronic circuitry 60, and provide power to the battery charging processor.

Wherein the detachable battery 20 source is not attached, FIG. 8 the $2^{nd}$ internal battery condition detection circuitry 31 detects the $2^{nd}$ level low internal battery detections example at 375 ma capacity remaining, the battery charging circuitry 40 processor powered by the $2^{nd}$ internal battery 22 is not charging the $1^{st}$ internal battery, as it requires a detachable battery 20 to charge the internal first battery, since no detachable battery 20 is attached, the battery charging processor activates the detachable battery 20 signaling device 70, for the user to attach a charged detachable battery 20, to charge the internal $1^{st}$ and further $2^{nd}$ internal battery 22, and the processor 10 battery switching circuitry 50 adapts the $2^{nd}$ internal battery 22 to provide power to the mobile communication apparatus electronic circuitry 60.

wherein FIG. 9, when first internal battery 21, becomes defective and does not hold battery charge, the present invention mobile communication apparatus processor 10 battery condition detection circuitry 30 and battery charging circuitry 40 detects the 1st internal battery 21 not holding charge, and the processor 10 activates the signaling device 70 with a distinct signal(s), to alert the user to the presence of $1^{st}$ internal defective battery 21 condition, while the mobile communication device power switching circuitry 50 providing power to the wireless communication electronic circuitry 60 from the $2^{nd}$ internal battery 22, and may transmit $1^{st}$ internal defective battery condition to a monitoring station 80, thus providing ample time for the user or monitoring personal to replace the internal defective first battery 21.

Figure 18:
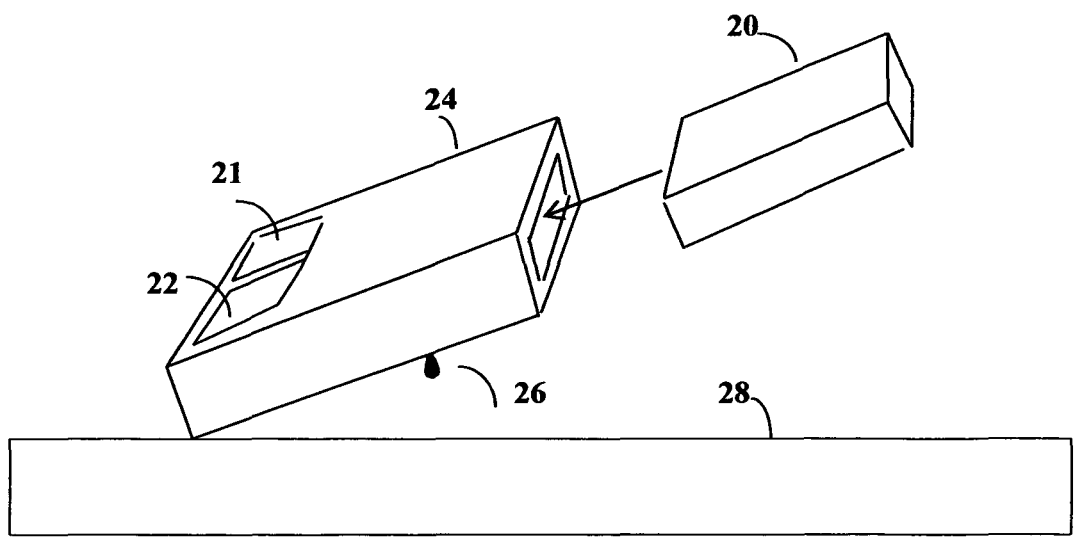
FIG. 18 Illustrates a mobile communication apparatus containing two internal batteries, and one detachable battery used to charge the first and second internal battery, or just the first battery, it is securely attached to a person or subject to be monitored having a tamper detection housing and a removal tamper detection sensor.
Figure 19:
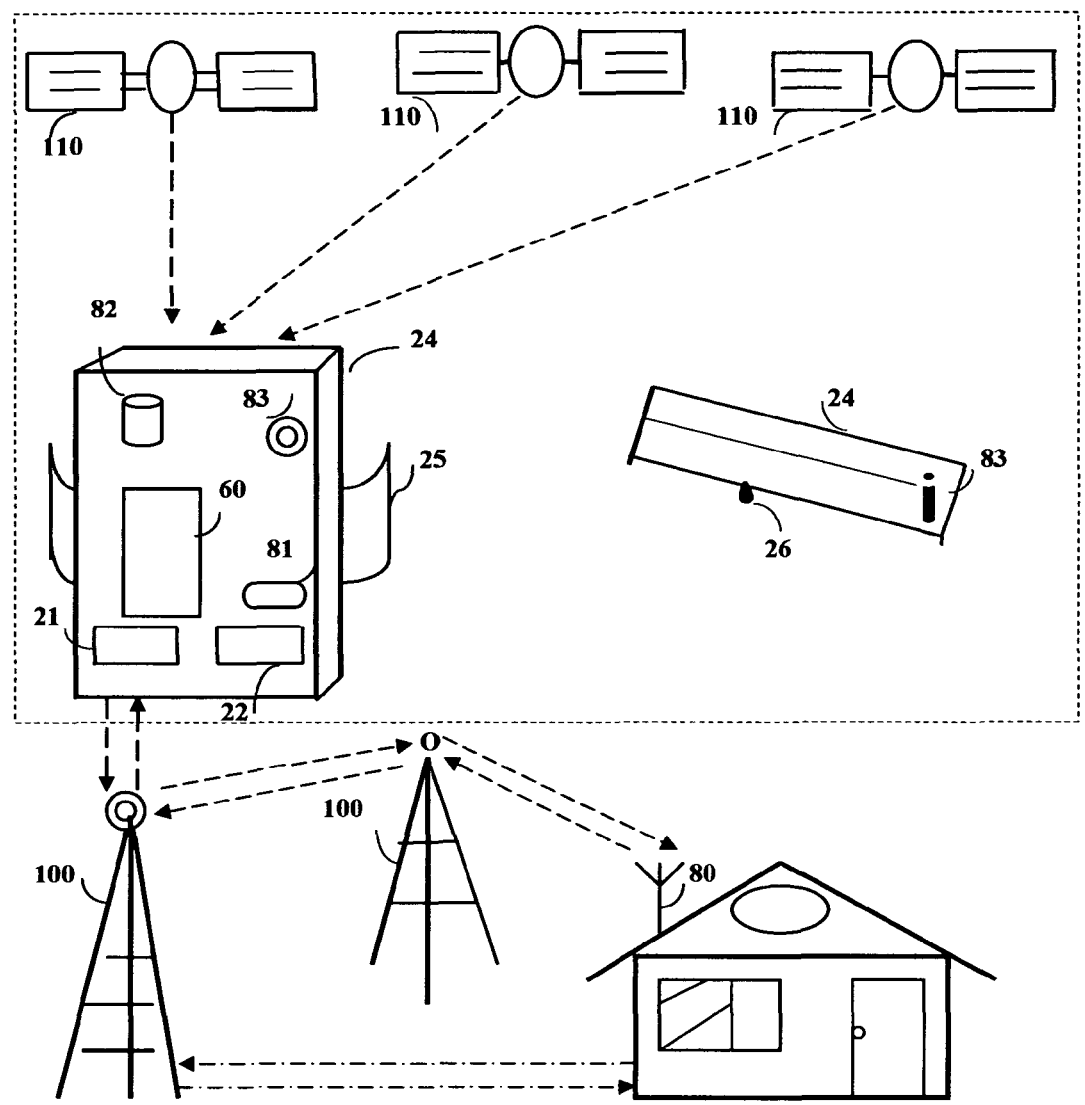
FIG. 19 Illustrates GPS satellites, a mobile communication apparatus having a tamper detection housing, containing a positioning locator, an RF transceiver circuitry, and illustrates wireless communication network towers, used to establish communication between the apparatus and a monitoring station.

The present invention mobile communication apparatus FIGS. 17, 18, and 19 housing 24. FIG. 10 power switching circuitry 50 is providing power from the $2^{nd}$ internal battery 22, at $2^{nd}$ level low battery condition example at 375 ma capacity remaining to the wireless communication processor electronic circuitry 60, and supplying power to the battery charging 40 processor 10 circuitry 10. The battery charging processor 10 low battery detection circuitry 30 detecting 3rd level 1st internal low battery 21 condition, example at 150 ma, the processor activating the signaling device 70 to produce an alert signal to notify the user to attach or insert a charged up detachable battery 20 to charge the first and internal battery 21, and there after the second internal battery 22. And the processor 10 may transmits $1^{st}$ internal low battery detection condition information example at 150 ma remaining capacity to a monitoring station 80.

Figure 11:
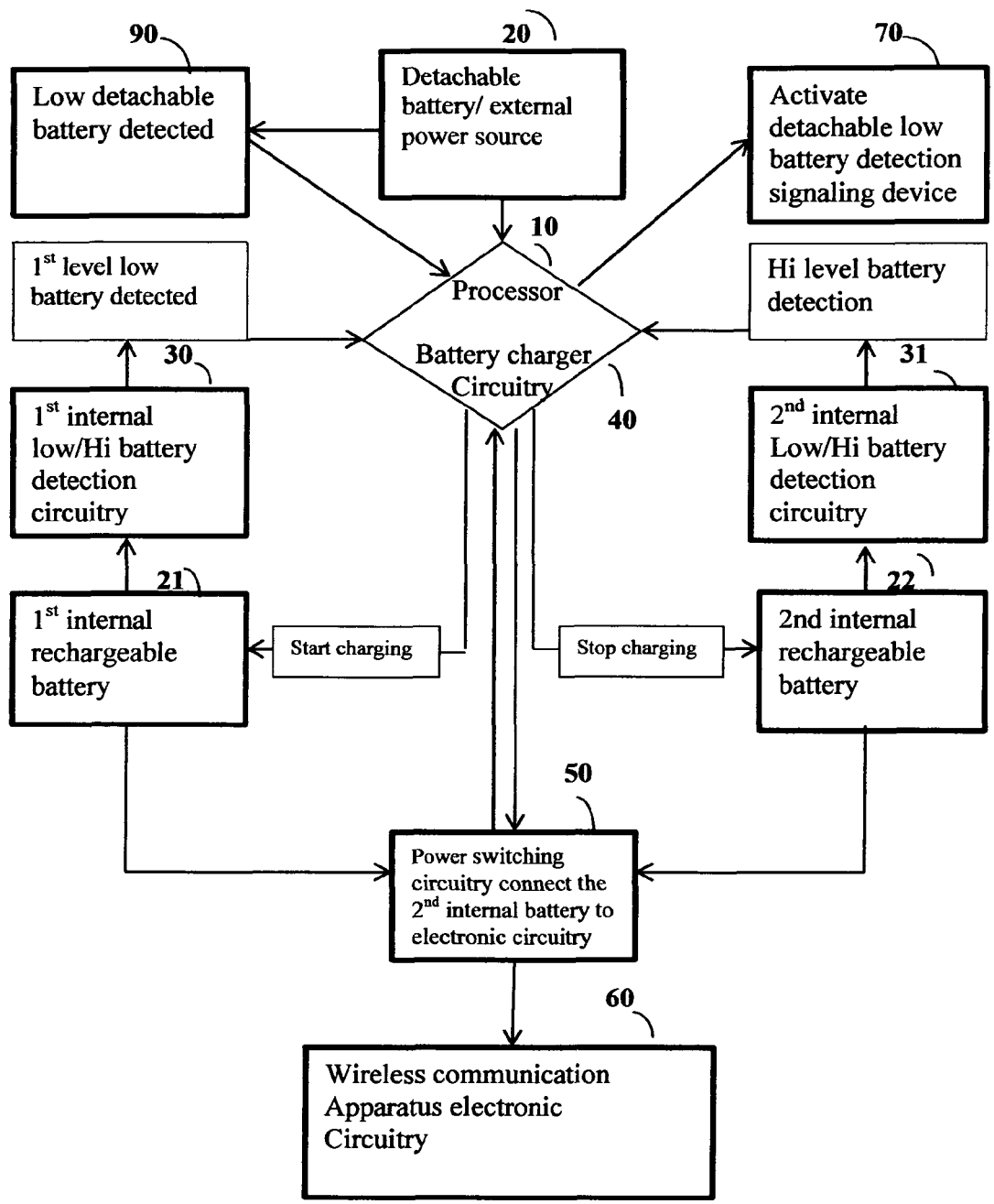
FIG. 11 Is a block diagram flow wherein the detachable battery power is attached to the apparatus, the battery charging circuitry is charging the first internal battery, the $2^{nd}$ internal battery condition detection circuitry detecting hi level $2^{nd}$ internal battery condition, and the battery charging circuitry stop charging the $2^{nd}$ internal battery, and the power switching circuitry is providing power to the apparatus electronic circuitry from the $2^{nd}$ internal battery, and the detachable low battery condition detection circuitry is detecting low detachable battery condition, the processor activating the signaling device electronic circuitry.

The present invention wireless communication apparatus additionally contains FIG. 11 a low battery detection circuitry 90 configured to detect the detachable battery 20 condition, the signaling device 70 is further configured to initiate a distinct alert signal(s) to notify the user that the detachable battery 20 has reached a predetermined low battery power level example at 200 ma capacity remaining, and there for battery charging circuitry will stop charging the $1^{st}$ internal battery, for the user to detach and charge the detachable battery 20 by the use of an external charger, thus not fully discharging the detachable battery 20 to prolong detachable battery charge cycle, while the power switching circuitry 50 is providing power to the wireless communication apparatus electronic circuitry 60 and to the battery charge processor circuitry, from $2^{nd}$ internal battery. The apparatus signaling device 70 initiates alert signal(s) for the user to re-attach or insert a charged detachable battery 20 to the housing wherein, wherein when the internal $1^{st}$ battery 31 or second battery 32 becomes at $2^{nd}$ level low battery condition at example; 375 ma capacity remaining.

Figure 12:
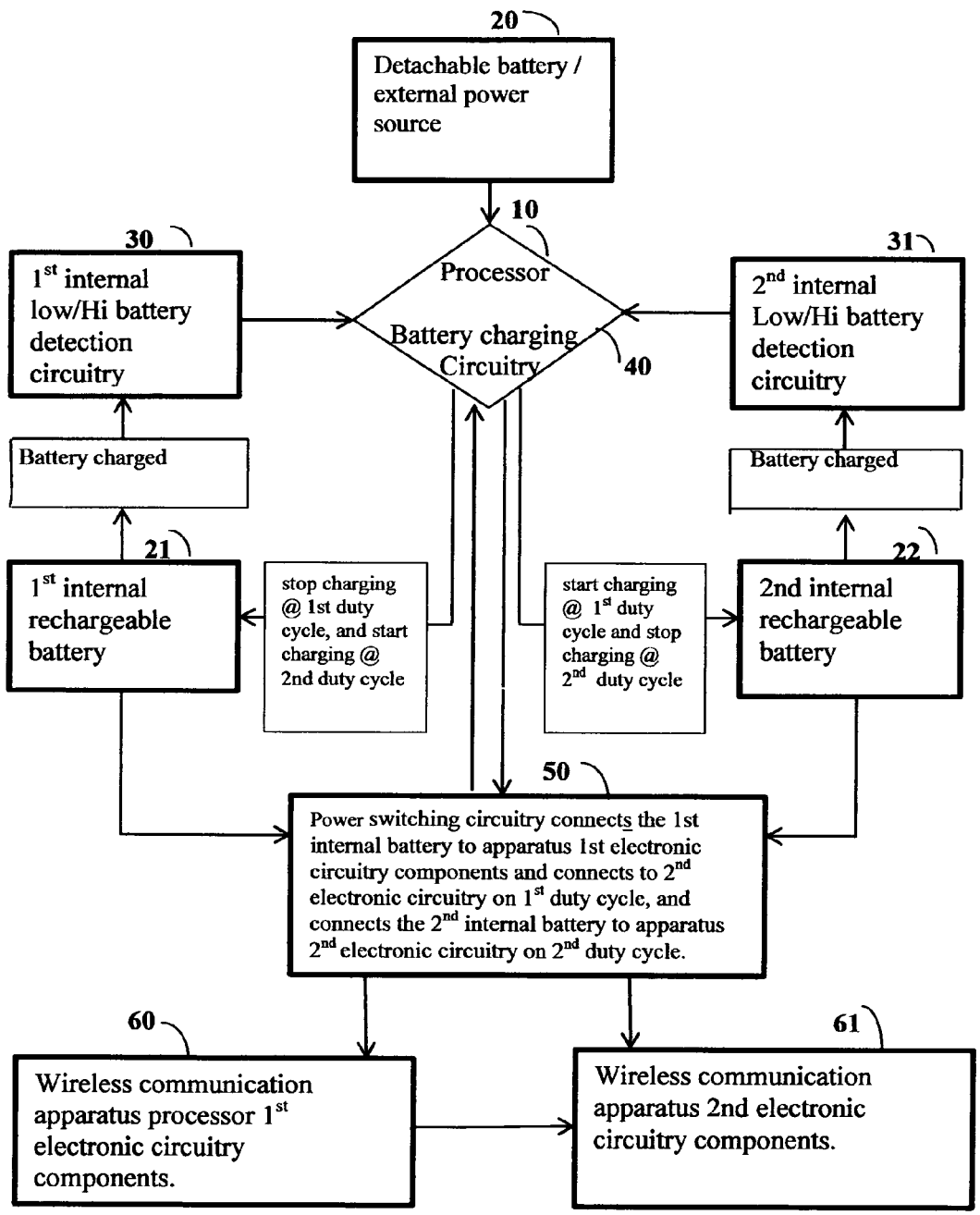
FIG. 12, Is a block diagram flow chart wherein the detachable batter is attached, the battery charging circuitry is charging the $2^{nd}$ internal battery at 1st duty cycle time period, and not charging the $1^{st}$ internal battery, as the power switching circuitry is providing power from the $1^{st}$ internal battery at that 1st duty cycle time period to the apparatus processor $1^{st}$ electronic circuitry components and to the 2nd electronic circuitry components. On $2^{nd}$ duty cycle, the battery charging circuitry is charging the $1^{st}$ internal battery on $2^{nd}$ duty cycle time period, and not charging the $2^{nd}$ internal battery, as the power switching circuitry is providing on $2^{nd}$ duty cycle power from the $2^{nd}$ internal battery to the apparatus 2nd electronic circuitry component.

The present invention mobile communication apparatus FIGS. 12, and 19 housing 24 further contains a GPS receiver 82, to provide monitoring station the apparatus positioning location, which is securely attached to an person to be monitored, the positioning locator apparatus utilizes a detachable battery 20 used to charge the mobile communication device first internal battery 21 and 2nd internal battery 22, wherein the battery charging circuitry 40, processor 10 is configured to charge the $2^{nd}$ internal battery 22 on $1^{st}$ duty cycle for example at a 50% duty cycle time period, and not charge the 1st internal battery 21 during that $1^{st}$ duty cycle time period, while the power switching circuitry 50 is providing power from the $1^{st}$ internal battery to the wireless communication $1^{st}$ electronic circuitry 60 components, and supplying power to the apparatus 2nd electronic circuitry 61 from the first internal battery 21, and to the battery charging processor 10 circuitry. In the $2^{nd}$ duty cycle time period the battery charging processor 10 circuitry 40, stop charging the $2^{nd}$ internal battery 22 for the $2^{nd}$ example 50% duty cycle time period, and battery charging processor 10, sends a signal to the power switching circuitry 50, to connect the 2nd internal battery 22, to the wireless communication apparatus 2nd electronic circuitry 61, and provide power from the $2^{nd}$ internal battery 22, for example 50% duty cycle time period to the mobile communication apparatus 2nd electronic circuitry 61 components, and to the battery charging processor 10 circuitry 40, while the battery charging circuitry is charging the 1st internal battery 21 during that period, example $2^{nd}$ 50% duty cycle set time period. Thus the teaching provides a method wherein the processor power switching circuitry from the 1st internal battery 21 provides $1^{st}$ duty cycle time period power to the apparatus $1^{st}$ electronic circuitry components 60, which may be apparatus wireless communication processor electronic circuitry, or in addition may supply power to the battery condition detection processor circuitry, and same time provides power to the apparatus $2^{nd}$ electronic circuitry components 61, which may be the apparatus tamper detection electronic circuitry, and the second internal battery 22 provides power to the wireless communication apparatus 2nd electronic circuitry 61, and in addition may supply powers to the battery condition detection processor circuitry 10, on the $2^{nd}$ duty cycle time period, there for the apparatus $1^{st}$ electronic circuitry is operating on a duty cycle time period, there for the apparatus $2^{nd}$ electronic circuitry is continuously operating. The teaching is useful in applications where a user carryon apparatus 24 requires wireless battery charging in remote location, wherein the apparatus certain electronic circuitry must be functional all the time (In this example the apparatus $2^{nd}$ electronic circuitry which relates to tamper detection circuitry) in order to ascertain full functional operation of the present invention apparatus 24, while the apparatus $1^{st}$ electronic circuitry 60 be operative on a duty cycle time period, without interrupting the apparatus tamper detection circuit functionality. And for the user to charge the apparatus both internal batteries 21, 22 at a duty cycle time period without effecting apparatus functionality, and conserve apparatus internal battery life.

Figure 13:
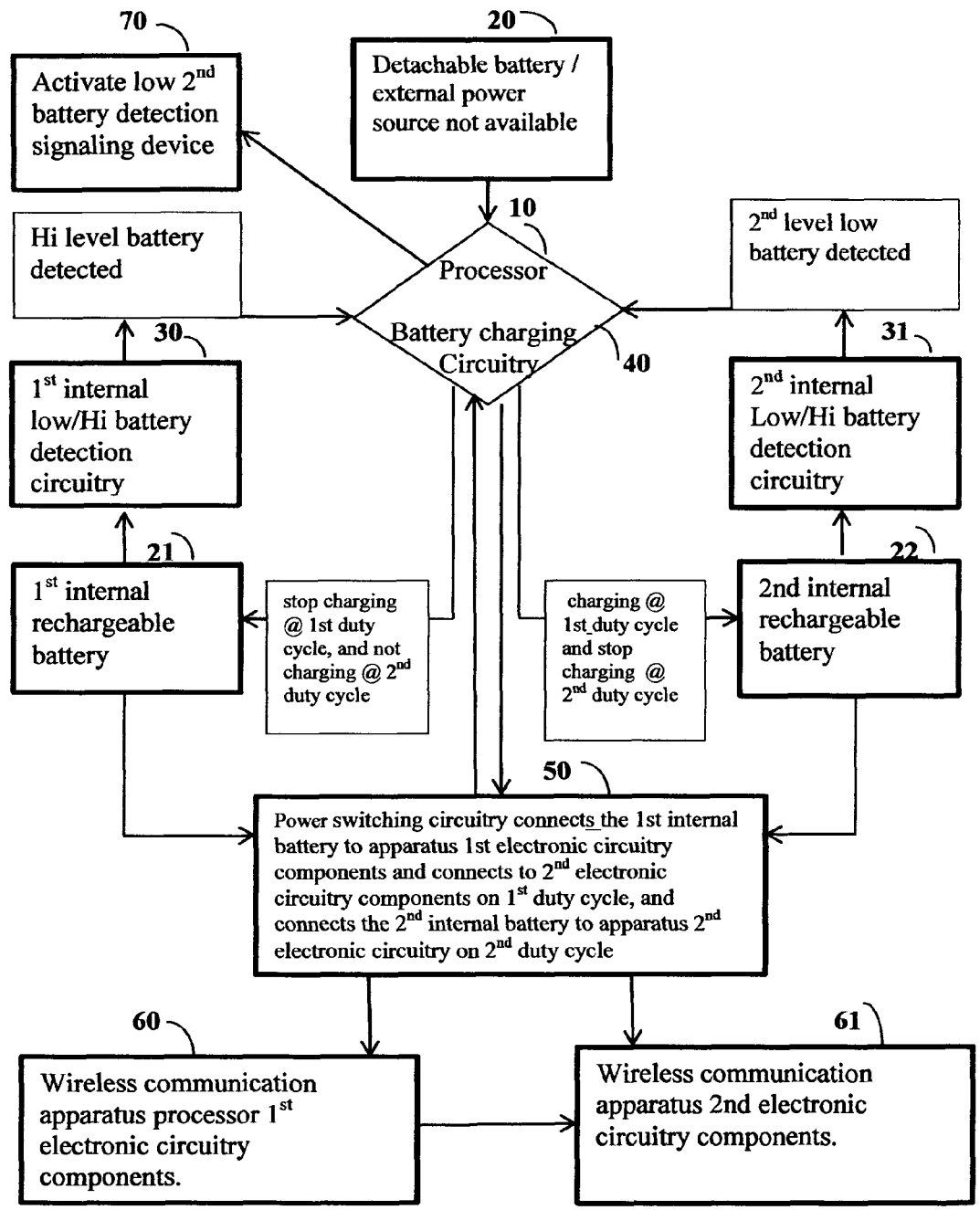
FIG. 13, Is a block diagram flow chart wherein the detachable battery power is not available, the power switching circuitry is supplying power on $1^{st}$ duty cycle time period from the first internal battery to the apparatus 1st electronic circuitry components, and $2^{nd}$ electronic circuitry components. And the power switching circuitry is supplying power from the apparatus $2^{nd}$ internal battery on 2nd duty cycle time period to the apparatus $2^{nd}$ electronic circuitry components. The battery charging circuitry is not charging the $1^{st}$ and $2^{nd}$ internal batteries, and the battery charging processor activating $2^{nd}$ internal low battery detection signaling device circuitry.

The present invention positioning locator mobile communication apparatus FIGS. 17, 18, and 19 housing 24 securely attached to an person 28 to be monitored, FIG. 13 the positioning locator apparatus utilizes a detachable battery 20 is not attached or exhausted, the battery charging circuitry is not charging the $1^{st}$ internal and $2^{nd}$ internal batteries 21, 22 with example 50% duty cycle time period. The power switching circuitry 50 is providing power from the $1^{st}$ internal battery 21 to the battery charge processor 10 circuitry 40, and the battery charging circuitry is sending signal to the power switching circuitry 50, to connect the $1^{st}$ internal battery 21 to the wireless communication $1^{st}$ electronic circuitry 60 components, and provide power from the $1^{st}$ internal battery 21, example for 50% duty cycle time period to the mobile communication apparatus certain components electronic circuitry 60, and supply power to the wireless communication apparatus $2^{nd}$ electronic circuitry 61. And thereafter, the battery charging processor sends a signal to the power switching circuitry 50 to connect the $2^{nd}$ internal battery 22 to the wireless communication device $2^{nd}$ electronic circuitry 61 to provide power example, for the second 50% duty cycle time period to the wireless communication apparatus 2nd electronic circuitry components, there for both batteries 21, 22 keep a constant flow of power to the apparatus $2^{nd}$ electronic circuitry 61, such as example; FIGS. 17, 18 and 19 to keep the apparatus tamper detection circuitry 25, 26 and 83 to be operative all the time to detect tamper detection any given time. The wireless communication apparatus $2^{nd}$ low battery detection circuitry sending a $2^{nd}$ low level battery detection, example at 375 ma capacity remaining to the battery charging processor 10, and the processor in response of receipt of low battery detection signal activates the $2^{nd}$ level low battery detection signaling device 70, for the user to attached a fully charged up detachable battery to charge the $2^{nd}$ internal battery 22.

The present invention positioning locator mobile communication apparatus FIGS. 17, 18, and 19 housing 4 securely attached with a tamper detection strap 25, or securely attached example by a Velcro tape, or by use of adhesive, screw etc. using a removal tamper detection sensor 26 to a person or subject 28 to be monitored. Further the apparatus housing 24 may contain an internal sensor 83 used to detect tampering of the apparatus housing.

Figure 14:
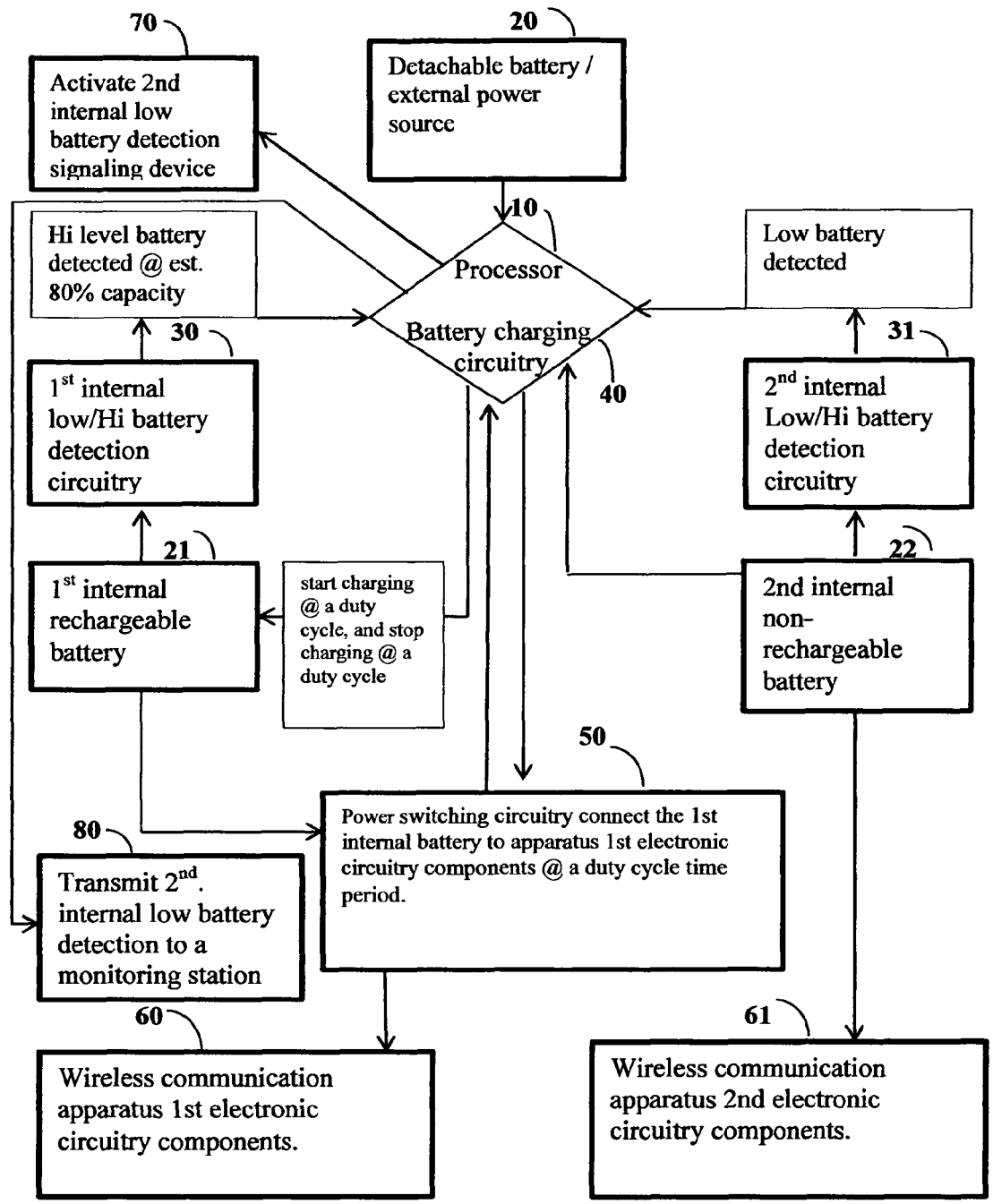
FIG. 14 Is a block diagram flow chart wherein the battery charging circuitry stop charging the 1st internal battery on 1st duty cycle time period, and power switching circuitry is providing power from the $1^{st}$ internal battery on 1st duty cycle time period to the apparatus $1^{st}$ electronic circuitry components, and start charging the internal first battery on 2nd duty cycle time period, and stop providing power from the $1^{st}$ internal battery to the apparatus 1st electronic circuitry during that 2nd duty cycle time period. And the apparatus $2^{nd}$ non-rechargeable internal battery is used to power the apparatus $2^{nd}$ electronic circuitry components. The $2^{nd}$ internal battery condition detection circuitry is detecting low $2^{nd}$ internal battery, and the apparatus processor activating the $2^{nd}$ low battery detection signaling circuitry.

The positioning locator apparatus utilizes FIG. 14 a detachable battery 20 used to charge the mobile communication device first internal battery 21. Whereas the battery charging circuitry 40 processor 10 is configured to stop charging the $1^{st}$ internal battery 21 example; for 50% duty cycle time period, while the apparatus power switching circuitry is providing power from the $1^{st}$ internal battery 21 to the apparatus $1^{st}$ electronic circuitry components 60, and start charging the first battery 21 for the second duty cycle time period example; 50% duty cycle time period, and sends a signal to the power switching circuitry 50 to disconnect the $1^{st}$ internal battery 21 from wireless communication $1^{st}$ electronic circuitry 60. The wireless communication apparatus in addition contains a none rechargeable battery 22 used to supply power to the wireless communication apparatus $2^{nd}$ electronic circuitry 61. Therefor the present invention teaching provides a method wherein the first internal battery 21 is charged and discharged at a preselect duty cycle time period to operate the communication apparatus first electronic circuitry at a set duty cycle time period, wherein the second internal none rechargeable battery 22, provides constant power to the wireless communication apparatus $2^{nd}$ electronic circuitry components 61, wherein the $2^{nd}$ electronic circuitry components require constant power to function properly. Example; the non-rechargeable second internal battery supplying constant power to the apparatus tamper detection circuitry 25, 26, or other circuitry. Further the processor 10 second low battery detection circuitry 31 is detecting second internal low battery 22 condition, and activating the signaling circuitry 70 and may transmit the detected low battery condition to a monitoring station 80.

Figure 15:
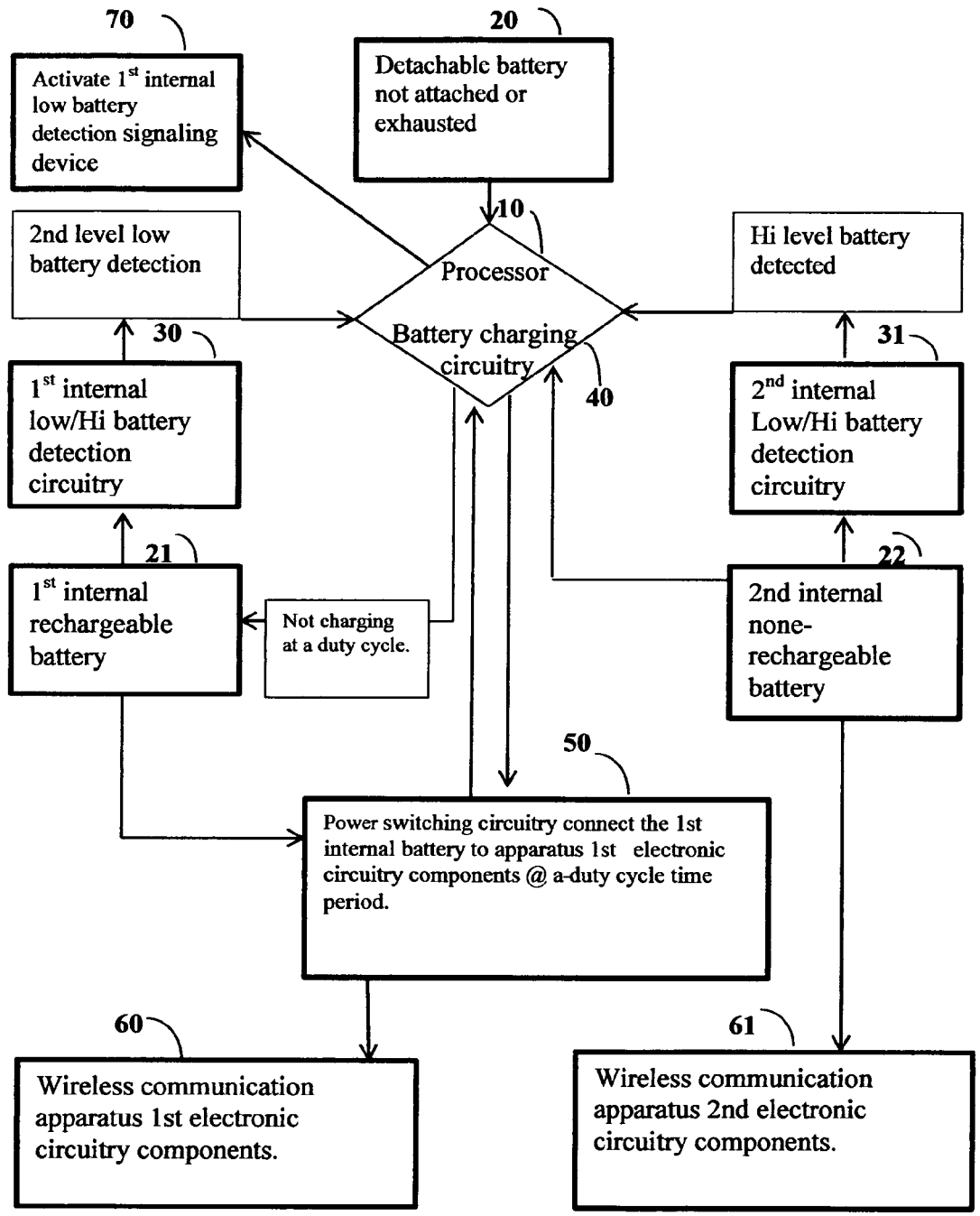
FIG. 15 Is a block diagram flow chart wherein the detachable battery is not attached or exhausted, the battery charging circuitry is not charging the 1st internal battery at a set duty cycle time period, and power switching circuitry is providing power from the $1^{st}$ internal battery at that set duty cycle time period to the apparatus $1^{st}$ electronic circuitry components, and the low battery detection circuitry is detecting $1^{st}$ internal battery $2^{nd}$ level low battery condition, and the processor activating $1^{st}$ internal low battery detection signaling circuitry. And the apparatus $2^{nd}$ non-rechargeable internal battery is providing power to the apparatus $2^{nd}$ electronic circuitry components.

The present invention positioning locator mobile communication apparatus FIGS. 17, 18, and 19 housing 4 securely attached with a tamper detection circuitry 25, 26 to a person or subject 28 to be monitored. FIG. 15, the positioning locator apparatus utilizes a detachable battery 20 used to charge the mobile communication device first internal battery 21, wherein the detachable battery 20 is not attached or exhausted, the battery detection circuitry 30 is detecting $1^{st}$ internal $2^{nd}$ level low battery condition, example; at 375 ma capacity remaining, the battery charging circuitry 40 processor 10 is not able to charge the $1^{st}$ internal battery 21 for example 50% duty cycle time period, since the detachable battery is not attached or exhausted, and the $1^{st}$ internal battery 21 providing power to the battery charging processor 10, and the processor 10 activating $1^{st}$ internal low battery detection signaling circuitry. The battery charging processor 10 sending a signal example at 50% duty cycle time period, for the power switching circuitry 50 to connect the $1^{st}$ internal battery 21 to the wireless communication $1^{st}$ electronic circuitry 60 components, to provide power from the $1^{st}$ internal battery 21, example; at example 50% duty cycle time period power to the mobile communication apparatus $1^{st}$ electronic circuitry components 60. The wireless communication apparatus contains a $2^{nd}$ none rechargeable battery 22 used to supply power to the wireless communication apparatus $2^{nd}$ electronic circuitry 61. There for the teaching utilizes a method wherein the first internal battery 21 is charged and then discharged at a preselect duty cycle time period to operate the communication apparatus first electronic circuitry at a set duty cycle time period, and the second internal battery 22 is used to keep constant flow of power to the wireless communication apparatus $2^{nd}$ electronic circuitry components, whereas the $2^{nd}$ electronic circuitry components require constant power to fully function the apparatus, one such example; to provide constant power to the apparatus tamper detection circuitry 25, 26, 83 wherein constant flow of battery power is required to detect apparatus tamper condition at any given time, or second battery 22 power may be used as power supply to other circuitries wherein constant flow of power is required in order the apparatus to be functional.

Figure 16:
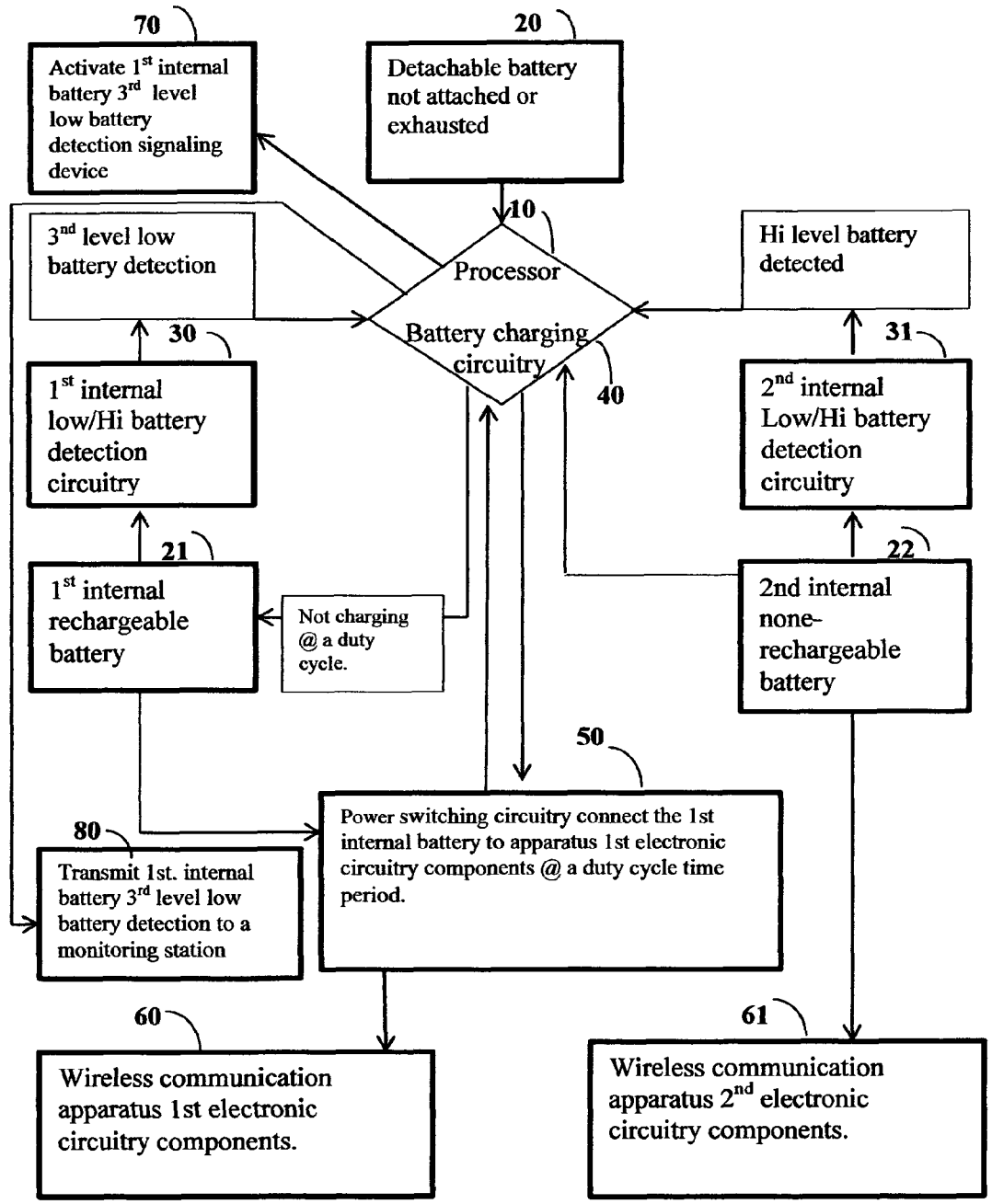
FIG. 16 Is a block diagram flow chart wherein the detachable battery is not attached or exhausted, the battery charging circuitry stop charging the 1st internal battery at a set duty cycle period time, and power switching circuitry is providing power from the $1^{st}$ internal battery at that set duty cycle time period to the apparatus 1st electronic circuitry components, and the processor activating $1^{st}$ internal battery low $3^{rd}$ level low battery detection signaling circuitry, and the apparatus processor is transmitting a signal to a monitoring station containing information to the apparatus $1^{st}$ internal battery $3^{rd}$ level condition And the apparatus $2^{nd}$ none rechargeable internal battery is providing power to the apparatus 2nd electronic circuitry components.

The mobile communication apparatus FIG. 16 detachable battery 20 is not attached or exhausted, the battery detection circuitry 30 is detecting $1^{st}$ internal battery at $3^{rd}$ level low battery condition, example; at 150 ma capacity remaining, the battery charging circuitry 40 processor 10 is not able to charge the $1^{st}$ internal battery 21 for example a 50% duty cycle time period, and the $1^{st}$ internal battery 21 providing power to the battery charging processor 10, and the processor 10 transmitting a signal(s) containing information to the apparatus first internal battery $3^{rd}$ level low battery condition to a monitoring station 80. And the battery charging processor 10 circuitry sending a signal for example; 50% duty cycle time period to the power switching circuitry 50 to connect the $1^{st}$ internal battery 21 to the wireless communication $1^{st}$ electronic circuitry 60 components, to provide power from the $1^{st}$ internal battery 21 at example 50% duty cycle time period, and the wireless communication apparatus 24 contains a none rechargeable battery 22 used to supply power to the wireless communication apparatus $2^{nd}$ electronic circuitry 61. The method teaches a first battery discharge at a preselect duty cycle time period to operate the communication apparatus 1st electronic circuitry components 60 at a set duty cycle time period, and keep constant flow of power from the apparatus second internal battery 22 to the wireless communication apparatus $2^{nd}$ or other electronic circuitry components 61, whereas such other components requires constant power for the apparatus to function properly. One such example; to provide constant power to the apparatus tamper detection circuitry, 25, 26, and 83, or other circuitry which requires constant flow of power, another example; battery charging processor circuitry 40, and low battery detection circuitry 30, 31.

The present mobile communication apparatus FIG. 10, 19 wherein the mobile communication apparatus RF transceiver 81 is utilized to establish communication with a monitoring station 80, and may be used to receives signals from cell/radio towers 100, to coordinate said apparatus positioning location, or the mobile communication apparatus may contain a positioning locator receiver 82 configured to receive signals from GPS satellites 110, to coordinate the apparatus positioning location, and may transmit the received positioning location coordinate signals to a monitoring station 80, for the monitoring station to obtain the location information of the apparatus.

The mobile communication apparatus utilizes tamper detection housing 24 is configured to detect housing tamper by the use of an internal sensor 83. The housing 24 may be attached to the subject to be monitored using a removal tamper sensor 26 or by a removal tamper detection strap 25, or both removal tamper sensor 26 and removal tamper detection strap 25. The mobile communication apparatus processor 60 in response to detecting tamper condition, the processor 60 sends a signal to the RF transceiver 81 to transmit at least one signal comprising an identification of the apparatus 24, the identification of the apparatus and a condition of the apparatus, the identification of the apparatus and positioning location information of the apparatus, or the identification of the apparatus, the condition of the apparatus, and the positioning location information of the apparatus to a monitoring station 80.

The invention claimed is:

1. Dual battery charger mobile communication apparatus, utilizing a first and second internal rechargeable battery, and a detachable battery or other wireless power means used to charge said apparatus first and second internal battery, wherein said first and second internal battery is used to provide power to said apparatus electronic circuitry components, comprises:

a housing containing said first and a second internal rechargeable battery, at least one processor having a battery condition detection circuitry configured to detect low battery condition of said first and said second internal batteries, and a battery charging circuitry configured to charge said first and said second internal batteries, and a power switching circuitry configured to supply power from said first and second internal battery to said apparatus electronic circuitry, and a signaling circuitry, said processor in conjunction with an RF transceiver circuitry used to establish RF communication with other communication devices through a wireless communication network, said processor in response to received low battery detection signal, activates said apparatus signaling circuitry for the user to attach said detachable battery to said apparatus to charge said first or second internal low battery, wherein when said apparatus first internal battery is in low condition, and said second internal battery is charged to a set level, said processor low battery detection circuitry detects said first internal low battery condition, and sends a signal to said power switching circuitry to disconnect said first low condition battery from said apparatus electronic circuitry, and connect said first internal low battery to said battery charging circuitry to obtain power from said detachable battery and charge said first internal low battery, and said processor power switching circuitry connects said charged second internal battery to said mobile communication apparatus electronic circuitry, to provide power to said apparatus electronic circuitry from said second internal battery, thereafter when said second internal battery becomes in low condition, said processor in response to received second internal low battery condition signal, sends a signal to said power switching circuitry to disconnect said second internal battery from said apparatus electronic circuitry, and connect said second internal battery to said apparatus battery charging circuitry to obtain power from said detachable battery to charge said second low condition internal battery, and connect said first internal battery to said apparatus electronic circuitry to supply power to said apparatus electronic circuitry.

2. Dual battery charger mobile communication apparatus as claimed in claim 1, wherein said mobile communication apparatus RF transceiver receives signals from cell/radio towers to coordinate said apparatus positioning location, or said mobile communication apparatus may contain a positioning locator receiver configured to receive signals from GPS satellites to coordinate said apparatus positioning location, and may transmit said received positioning location coordinate signals to a monitoring station.

3. Dual battery charger mobile communication apparatus as claimed in claim 2, wherein said mobile communication apparatus utilizes a tamper detection housing securely attached to a subject to be monitored, the tamper detection housing is configured to detect housing tamper or removal of said housing from said subject to be monitored, said housing may be attached to said subject to be monitored with a removal tamper sensor or by a removal tamper detection strap, or both removal tamper sensor and removal tamper detection strap, said mobile communication apparatus processor in response to detecting tamper condition, said processor RF transceiver is configured to transmit at least one signal comprising an identification of the apparatus, the identification of the apparatus and a condition of the apparatus, the identification of the apparatus and positioning location information of the apparatus, or the identification of the apparatus, the condition of the apparatus, and the positioning location information of the apparatus to a monitoring station.

4. Dual battery charger mobile communication apparatus as claimed in claim 1, wherein when said mobile communication apparatus processor low battery detection circuitry detects said apparatus first internal battery, second internal battery, or both first and second internal battery at a preset low level condition, and said processor battery charging circuitry automatically charges said first, or second internal battery, wherein when said detachable battery or other wireless power source is attached to said communication apparatus.

5. Dual battery charger mobile communication apparatus as claimed in claim 1, wherein said apparatus processor low battery detection circuitry in response to detecting a set level low battery condition, said apparatus processor may transmit signal(s) to a monitoring station indicative of said mobile communication device first, second, or both first and second internal batteries are in a set level low battery condition.

6. Dual battery charger mobile communication apparatus as claimed in claim 1, wherein when said mobile communication apparatus processor battery charge detection circuitry detects said apparatus first internal battery or second internal battery is not charging, said processor activates said mobile communication apparatus signaling circuitry to notify the user, indicating said apparatus first or second internal battery is exhausted and not holding charge, and said apparatus processor may transmit a signal to a monitoring station indicative of said mobile communication device first or second internal battery is exhausted and not holding charge.

7. Dual battery charger mobile communication apparatus as claimed in claim 1 wherein said apparatus detachable battery becomes low, said processor low battery detection circuitry detects said detachable battery low condition and activates said signaling circuitry to initiate an alert signal indicative to the user that the detachable battery has reached a set low power level; for the user to replace or detach and charge said detachable battery.

8. Dual battery charger mobile communication apparatus as claimed in claim 1, wherein said communication apparatus contains a first and second electronic circuitry, said first electronic circuitry at time interval operates in conjunction with said second electronic circuitry, said battery charging processor is configured to charge said apparatus second internal battery at a first duty cycle time period, and engaging said power switching circuitry to provide power from said apparatus first internal battery to said apparatus first electronic circuitry components, and provide power to said apparatus second electronic circuitry components, during said first duty cycle time period, and said apparatus battery charging processor charge said apparatus first internal battery at a second duty cycle time period, and engage said power switching circuitry to provide power from said apparatus second internal battery to said mobile communication apparatus second electronic circuitry components at said second duty cycle time period, to enable the first internal battery power to function said apparatus first electronic circuitry and function said apparatus second electronic circuitry at said first duty cycle time period, and enable said second internal battery power to function said apparatus second electronic circuitry at said second duty cycle time period, for continuous functionality of said apparatus second electronic circuitry.

9. Dual battery powered mobile communication apparatus, contains a first and second electronic circuitry, said first electronic circuitry at time interval operates in conjunction with said second electronic circuitry, utilizing a first internal rechargeable battery to power said first electronic circuitry, and a second internal non-rechargeable battery to provide power to said apparatus second electronic circuitry, and a detachable battery used for charging said apparatus first internal battery at a first duty cycle time period, said apparatus processor is configured to provide power from said apparatus first internal battery to said apparatus first electronic circuitry at a second duty cycle time period, said apparatus comprises:
 a housing containing a first internal rechargeable battery, and
 a second internal non rechargeable battery,
 a detachable battery attached or inserted into said housing to charge said first internal battery,
 a first and second electronic circuitry,
 at list one processor having a low battery detection circuitry configured to detect low battery condition of said first battery, said second battery, or both first and second internal battery, and
 a battery charging circuitry configured to charge said first internal battery at a duty cycle time period, and
 a power supply switching circuitry configured to supply power at a duty cycle time period from said first internal battery to said apparatus first electronic circuitry, and
 a signaling circuitry,
 said processor in conjunction with an RF transceiver circuitry used to establish RF communication with other communication devices through a wireless communication network, wherein when said apparatus battery condition detection circuitry detects said first internal low battery condition, said processor activates said apparatus signaling circuitry for the user to attach or insert said detachable battery to said apparatus to charge said first internal battery, wherein when said battery condition detection circuitry detects said second internal low battery condition, said processor may activates said apparatus signaling circuitry indicating said second internal low battery condition, and said processor may transmit a signal to a monitoring station containing information to said apparatus first, second, or both internal low battery condition.

10. Dual battery powered mobile communication apparatus as claimed in claim 9, wherein said mobile communication apparatus RF transceiver receives signals from cell/radio towers for said processor to coordinate said apparatus positioning location, or said mobile communication apparatus may contain a positioning locator receiver configured to receive signals from GPS satellites for said processor to coordinate said apparatus positioning location, and may transmit said received positioning location coordinate signals to a monitoring station.

11. Dual battery powered mobile communication apparatus as claimed in claim 10, wherein said mobile communication apparatus utilizes a tamper detection housing securely attached to a subject to be monitored, the tamper detection housing is configured to detect housing tamper or removal of said housing from said subject to be monitored, said housing may be attached to said subject to be monitored with a removal tamper sensor or by a removal tamper strap, or both removal tamper sensor and removal tamper detection strap, said mobile communication apparatus processor in response to detecting tamper condition, said processor RF transceiver is configured to transmit at least one signal comprising an identification of the apparatus, the identification of the apparatus and a condition of the apparatus, the identification of the apparatus and positioning location information of the apparatus, or the identification of the apparatus, the condition of the apparatus, and the positioning location information of the apparatus to a monitoring station.

12. Dual battery powered mobile communication apparatus as claimed in claim 9, wherein said apparatus processor low battery detection circuitry in response to detecting said first internal low battery condition, said apparatus processor transmits signal(s) to a monitoring station indicative of said mobile communication device first internal battery below a set level low battery condition.

13. Dual battery charger mobile communication apparatus as claimed in claim 9, wherein when said mobile communication apparatus processor battery charge detection circuitry detects said apparatus first internal battery is not charging, said processor activates said mobile communication apparatus signaling circuitry to notify the user, indicating said apparatus first internal battery is exhausted and not holding charge, and the apparatus processor may transmit a signal to a monitoring station indicative of said mobile communication device first internal battery is exhausted not holding charge.

14. Dual battery charger mobile communication apparatus as claimed in claim 9 wherein said apparatus detachable battery becomes low, said processor low battery detection circuitry detects said detachable battery low condition and activates said signaling circuitry to initiate an alert signal indicative to the user that the detachable battery has reached a set low power level; for the user to replace or detach and charge said detachable battery.

* * * * *